(12) United States Patent
Karpov et al.

(10) Patent No.: US 10,270,529 B2
(45) Date of Patent: Apr. 23, 2019

(54) SINGLE AND MULTIPLE SOLITON GENERATION DEVICE AND METHOD

(71) Applicant: ECOLE POLYTECHNIQUE FEDERALE DE LAUSANNE (EPFL), Lausanne (CH)

(72) Inventors: Maxim Karpov, Lausanne (CH); Victor Brasch, Lausanne (CH); Tobias Kippenberg, Lausanne (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 0 days.

(21) Appl. No.: 15/406,811

(22) Filed: Jan. 16, 2017

(65) Prior Publication Data

US 2018/0205463 A1    Jul. 19, 2018

(51) Int. Cl.
| | |
|---|---|
| *G02F 1/07* | (2006.01) |
| *G02F 1/35* | (2006.01) |
| *G02F 1/065* | (2006.01) |
| *H04B 10/40* | (2013.01) |
| *H04B 10/50* | (2013.01) |
| *H04B 10/60* | (2013.01) |
| *H04B 10/508* | (2013.01) |
| *H04B 10/2507* | (2013.01) |

(52) U.S. Cl.
CPC ....... *H04B 10/25077* (2013.01); *G02F 1/065* (2013.01); *G02F 1/073* (2013.01); *G02F 1/3513* (2013.01); *H04B 10/508* (2013.01); *G02F 2203/26* (2013.01); *H04B 10/40* (2013.01); *H04B 10/50* (2013.01); *H04B 10/60* (2013.01)

(58) Field of Classification Search
None
See application file for complete search history.

(56) References Cited

U.S. PATENT DOCUMENTS

| | | |
|---|---|---|
| 7,982,944 B2 | 7/2011 | Kippenberg et al. |
| 9,348,194 B2 | 5/2016 | Herr et al. |
| 2016/0011489 A1* | 1/2016 | Herr ..................... G02F 1/3513 385/2 |
| 2016/0327743 A1 | 11/2016 | Kippenberg et al. |

OTHER PUBLICATIONS

Braginsky, V. B., Gorodetsky, M. L., & Ilchenko, V. S. (1989). Quality-factor and nonlinear properties of optical whispering-gallery modes. Physics Letters A, 137(7-8), 393-397.

(Continued)

*Primary Examiner* — Darren E Wolf
(74) *Attorney, Agent, or Firm* — Andre Roland S.A.; Nikolaus Schibli

(57) ABSTRACT

A soliton generation apparatus comprising:
an optical resonator;
a pumping laser for providing light at a pumping wavelength into the optical resonator;
a generator for generating multiple solitons in the optical resonator;
a detuning device for changing the wavelength detuning between the pumping laser wavelength and an optical resonance wavelength of the optical resonator to remove at least one soliton of the generated multiple solitons to provide (i) a plurality of solitons that comprises at least one less soliton than that of the generated multiple solitons or (ii) a single soliton in the optical resonator.

40 Claims, 16 Drawing Sheets

(56) References Cited

OTHER PUBLICATIONS

Brasch, V., Geiselmann, M., Herr, T., Lihachev, G., Pfeiffer, M. H. P., Gorodetsky, M. L., & Kippenberg, T. J. (2016). Photonic chip-based optical frequency comb using soliton Cherenkov radiation. Science, 351(6271), 357-360.

Carmon, T., Yang, L., & Vahala, K. (2004). Dynamical thermal behavior and thermal self-stability of microcavities. Optics Express, 12(20), 4742-4750.

Chembo, Y. K., & Menyuk, C. R. (2013). Spatiotemporal Lugiato-Lefever formalism for Kerr-comb generation in whispering-gallery-mode resonators. Physical Review A, 87(5), 053852.

Chembo, Y. K., & Yu, N. (2010). Modal expansion approach to optical-frequency-comb generation with monolithic whispering-gallery-mode resonators. Physical Review A, 82(3), 033801.

Coen, S., Randle, H. G., Sylvestre, T., & Erkintalo, M. (2013). Modeling of octave-spanning Kerr frequency combs using a generalized mean-field Lugiato-Lefever model. Optics letters, 38(1), 37-39.

Del'Haye, P., Herr, T., Gavartin, E., Gorodetsky, M. L., Holzwarth, R., & Kippenberg, T. J. (2011). Octave spanning tunable frequency comb from a microresonator. Physical Review Letters, 107(6), 063901.

Del'Haye, P., Schliesser, A., Arcizet, O., Wilken, T., Holzwarth, R., & Kippenberg, T. J. (2007). Optical frequency comb generation from a monolithic microresonator. Nature, 450(7173), 1214-1217.

Del'Haye, P., Arcizet, O., Gorodetsky, M. L., Holzwarth, R., & Kippenberg, T. J. (2009). Frequency comb assisted diode laser spectroscopy for measurement of microcavity dispersion. Nature Photonics, 3(9), 529-533.

Ferdous, F., Miao, H., Leaird, D. E., Srinivasan, K., Wang, J., Chen, L., . . . & Weiner, A. M. (2011). Spectral line-by-line pulse shaping of on-chip microresonator frequency combs. Nature Photonics, 5(12), 770-776.

Fomin, A. E., Gorodetsky, M. L., Grudinin, I. S., & Ilchenko, V. S. (2005). Nonstationary nonlinear effects in optical microspheres. JOSA B, 22(2), 459-465.

Foster, M. A., Levy, J. S., Kuzucu, O., Saha, K., Lipson, M., & Gaeta, A. L. (2011). Silicon-based monolithic optical frequency comb source. Optics Express, 19(15), 14233-14239.

Godey, C., Balakireva, I. V., Coillet, A., & Chembo, Y. K. (2014). Stability analysis of the spatiotemporal Lugiato-Lefever model for Kerr optical frequency combs in the anomalous and normal dispersion regimes. Physical Review A, 89(6), 063814.

Grudinin, I. S., & Yu, N. (Mar. 2015). Towards efficient octave-spanning comb with micro-structured crystalline resonator. In SPIE LASE (pp. 93430F-93430F). International Society for Optics and Photonics.

Grudinin, I. S., Matsko, A. B., Savchenkov, A. A., Strekalov, D., Ilchenko, V. S., & Maleki, L. (2006). Ultra high Q crystalline microcavities. Optics Communications, 265(1), 33-38.

Guo, H., Karpov, M., Lucas, E., Kordts, A., Pfeiffer, M. H. P., Brasch, V., . . . & Kippenberg, T. J. (2016). Universal dynamics and deterministic switching of dissipative Kerr solitons in optical microresonators. Nature Physics.

Herr, T., Brasch, V., Jost, J. D., Wang, C. Y., Kondratiev, N. M., Gorodetsky, M. L., & Kippenberg, T. J. (2014). Temporal solitons in optical microresonators. Nature Photonics, 8(2), 145-152.

Herr, T., Hartinger, K., Riemensberger, J., Wang, C. Y., Gavartin, E., Holzwarth, R., . . . & Kippenberg, T. J. (2012). Universal formation dynamics and noise of Kerr-frequency combs in microresonators. Nature Photonics, 6(7), 480-487.

Ideguchi, T., Holzner, S., Bernhardt, B., Guelachvili, G., Picqué, N., & Hänsch, T. W. (2013). Coherent Raman spectro-imaging with laser frequency combs. Nature, 502(7471), 355-358.

Ilchenko, V. S., Savchenkov, A. A., Matsko, A. B., & Maleki, L. (2004). Nonlinear optics and crystalline whispering gallery mode cavities. Physical review letters, 92(4), 043903.

Jang, J. K., Erkintalo, M., Coen, S., & Murdoch, S. G. (2015). Temporal tweezing of light through the trapping and manipulation of temporal cavity solitons. Nature communications, 6.

Karpov, M., Guo, H., Kordts, A., Brasch, V., Pfeiffer, M., Zervas, M., . . . & Kippenberg, T. J. (2015). Raman induced soliton self-frequency shift in microresonator Kerr frequency combs. arXiv preprint arXiv:1506.08767.

Kippenberg, T. J., Holzwarth, R., & Diddams, S. A. (2011). Microresonator-based optical frequency combs. Science, 332(6029), 555-559.

Kippenberg, T. J., Spillane, S. M., & Vahala, K. J. (2004). Kerr-nonlinearity optical parametric oscillation in an ultrahigh-Q toroid microcavity. Physical review letters, 93(8), 083904.

Kordts, A., Pfeiffer, M. H. P., Guo, H., Brasch, V., & Kippenberg, T. J. (2016). Higher order mode suppression in high-Q anomalous dispersion SiN microresonators for temporal dissipative Kerr soliton formation. Optics letters, 41(3), 452-455.

Lamont, M. R., Okawachi, Y., & Gaeta, A. L. (2013). Route to stabilized ultrabroadband microresonator-based frequency combs. Optics letters, 38(18), 3478-3481.

Leo, F., Coen, S., Kockaert, P., Gorza, S. P., Emplit, P., & Haelterman, M. (2010). Temporal cavity solitons in one-dimensional Kerr media as bits in an all-optical buffer. Nature Photonics, 4(7), 471-476.

Levy, J. S., Gondarenko, A., Foster, M. A., Turner-Foster, A. C., Gaeta, A. L., & Lipson, M. (2010). CMOS-compatible multiple-wavelength oscillator for on-chip optical interconnects. Nature Photonics, 4(1), 37-40.

Liang, W., Eliyahu, D., Ilchenko, V. S., Savchenkov, A. A., Matsko, A. B., Seidel, D., & Maleki, L. (2015). High spectral purity Kerr frequency comb radio frequency photonic oscillator. Nature communications, 6.

Liang, W., Savchenkov, A. A., Matsko, A. B., Ilchenko, V. S., Seidel, D., & Maleki, L. (2011). Generation of near-infrared frequency combs from a MgF 2 whispering gallery mode resonator. Optics letters, 36(12), 2290-2292.

Matsko, A. B., & Maleki, L. (2015). Feshbach resonances in Kerr frequency combs. Physical Review A, 91(1), 013831.

Moss, D. J., Morandotti, R., Gaeta, A. L., & Lipson, M. (2013). New CMOS-compatible platforms based on silicon nitride and Hydex for nonlinear optics. Nature Photonics, 7(8), 597-607.

Okawachi, Y., Saha, K., Levy, J. S., Wen, Y. H., Lipson, M., & Gaeta, A. L. (2011). Octave-spanning frequency comb generation in a silicon nitride chip. Optics letters, 36(17), 3398-3400.

Papp, S. B., Beha, K., Del'Haye, P., Quinlan, F., Lee, H., Vahala, K. J., & Diddams, S. A. (2014). Microresonator frequency comb optical clock. Optica, 1(1), 10-14.

Papp, S. B., Del'Haye, P., & Diddams, S. A. (2013). Parametric seeding of a microresonator optical frequency comb. Optics express, 21(15), 17615-17624.

Pfeiffer, M. H., Kordts, A., Brasch, V., Zervas, M., Geiselmann, M., Jost, J. D., & Kippenberg, T. J. (2016). Photonic Damascene process for integrated high-Q microresonator based nonlinear photonics. Optica, 3(1), 20-25.

Pfeifle, J., Brasch, V., Lauermann, M., Yu, Y., Wegner, D., Herr, T., . . . & Schmogrow, R. (2014). Coherent terabit communications with microresonator Kerr frequency combs. Nature photonics, 8(5), 375-380.

Pfeifle, J., Kordts, A., Mann, P., Karpov, M., Pfeiffer, M., Brasch, V., . . . & Koos, C. (May 2015). Full C and L-band transmission at 20 Tbit/s using cavity-soliton Kerr frequency combs. In CLEO: Science and Innovations (pp. JTh5C-8). Optical Society of America.

Savchenkov, A. A., Matsko, A. B., Strekalov, D., Mohageg, M., Ilchenko, V. S., & Maleki, L. (2004). Low Threshold Optical Oscillations in a Whispering Gallery Mode C a F 2 Resonator. Physical review letters, 93(24), 243905.

Yi, X., Yang, Q. F., Yang, K. Y., Suh, M. G., & Vahala, K. (2015). Soliton frequency comb at microwave rates in a high-Q silica microresonator. Optica, 2(12), 1078-1085.

\* cited by examiner

SINGLE AND MULTIPLE SOLITON GENERATION DEVICE AND METHOD

STATEMENT REGARDING FEDERALLY SPONSORED RESEARCH OR DEVELOPMENT

The present invention was made with U.S. Government support under contracts awarded by Defense Advanced Research Projects Agency (DARPA), Defense Sciences Office (DSO) and Air Force Office of Scientific Research (AFOSR). The US Government may have certain rights in the invention.

FIELD OF THE INVENTION

The present invention relates to the field of optical devices, and more particularly to an apparatus including an optical resonator for single and multiple soliton generation as well as an apparatus for controlled switching and holding of one or more solitons in the resonator. The present invention also relates to a method for single and multiple soliton generation in a resonator as well as controlled switching and holding of one or more solitons in the resonator.

DISCUSSION OF THE BACKGROUND ART

Dissipative temporal Kerr solitons in optical microresonators enable to convert a continuous wave laser into a train of femtosecond pulses. Of particular interest are single soliton states, whose $sech^2$ spectral envelope provides a spectrally smooth and low noise optical frequency comb, and that recently have been generated in crystalline, silica, and silicon-nitride resonators. They constitute sources that are unique in their ability to provide short femtosecond pulses at microwave repetition rates. Likewise, they provide essential elements to realize chip-scale, integrated frequency combs for time-keeping, spectroscopy, navigation or telecommunications.

However, to date, the dynamics of this class of solitons in microresonators remains largely unexplored, and the reliable generation of single soliton states remains challenging.

Microresonator frequency combs (Kerr combs) have opened a novel research area at the interface of micro- and nano-photonics and frequency metrology. Kerr combs are generated in high-Q millimeter- or microscale resonators via parametric processes driven by continuous wave (CW) laser. Kerr combs have attracted significant attention over past years due to unprecedented compactness, demonstrated octave-spanning operation, repetition rates in the microwave domain (>10 GHz), and the ability to be operated in low noise regimes. They promise chip-scale optical frequency combs connecting RF to optical domain that could make metrology ubiquitous, widely accessible beyond specialized metrology laboratories.

Recently, it has been demonstrated that Kerr combs can be operated in the regime of temporal dissipative Kerr solitons (DKS). DKS allow for fully coherent optical frequency combs (soliton combs) that can be sufficiently broadband for self-referencing via soliton induced Cherenkov radiation, and provide access to stable ultrashort pulses of tunable duration at microwave repetition rates. As mentioned, of particular interest are single soliton states that exhibit a spectrally smooth $sech^2$ envelope. Such soliton based frequency comb sources have a wide range of applications including molecular spectroscopy, coherent data transmission, arbitrary waveform generation, optical clocks or astrophysics, and more generally in applications where short pulse duration at microwave repetition rate is desirable.

Originally discovered to spontaneously form in crystalline $MgF_2$ resonators (and for the first time externally induced in optical fiber cavities), DKS have been demonstrated in a variety of high-Q resonator platforms, ranging from silica wedge resonators, to $Si_3N_4$ photonic chips and compact crystalline resonators pumped via distributed feedback lasers. Due to the recent nature of these findings, the soliton formation process and its dynamics remain to date largely unexplored.

While solitons have been reported in a number of platforms, the soliton generation procedures in high-Q microresonators are inherently stochastic (techniques used in optical fiber cavities are technically impractical due to much shorter round-trip time of microresonators). While CW laser tuning and "power kicking" schemes were proposed for soliton generation, these techniques presently do not allow to control the number of solitons formed in the resonator.

Another important question is the possibility of deterministic manipulation of states with multiple solitons in microresonators. Even though the states with various number of solitons could be generated in optical microresonators, the transitions between them take place stochastically via pairwise interactions of solitons when the pump is tuned, and cannot be predicted so far. Due to these effects, deterministic generation of the single soliton state still represents an outstanding challenge.

One more challenge is the non-destructive monitoring of the soliton state. The soliton regime in microresonators is fragile (though self-sustainable) and is not persistent against significant thermal drifts and other external perturbations. The reported passive lifetime of DKS achieves several hours in a stable laboratory environment, however, no technique is known to enable feedback stabilized control of soliton state, preventing it from decay.

SUMMARY

It is therefore one aspect of the present disclosure to provide a soliton generation apparatus and method that overcomes the above challenges. The soliton generation apparatus preferably includes an optical resonator, a pumping laser for providing light at a pumping wavelength into the optical resonator; a generator for generating multiple solitons in the optical resonator, a detuning device for changing the wavelength detuning between the pumping laser wavelength and an optical resonance wavelength of the optical resonator to remove at least one soliton of the generated multiple solitons to provide (i) a plurality of solitons that comprises at least one less soliton than that of the generated multiple solitons or (ii) a single soliton in the optical resonator.

According to another aspect of the present disclosure, the detuning device comprises a thermal tuner configured to apply or remove thermal energy to or from the optical resonator to displace the optical resonance wavelength of the optical resonator towards the pumping wavelength.

According to still another aspect of the present disclosure, the thermal tuner is configured to apply or remove thermal energy to or from the optical resonator to displace the optical resonance wavelength of the optical resonator across the pumping wavelength to generate the multiple solitons in the optical resonator.

According to yet another aspect of the present disclosure, the pumping laser is configured to provide light at a first wavelength into the optical resonator; and the apparatus includes a laser tuning controller configured to: (a) forward tune the pumping laser to tune the pumping laser light from the first wavelength, across a cavity resonance of the optical resonator, to a second wavelength to generate a frequency comb and multiple solitons in the optical resonator, the second wavelength being longer than the first wavelength; and configured to (b) backward tune the pumping laser light from the second wavelength to a third wavelength to remove at least one soliton of the generated multiple solitons to provide (i) a plurality of solitons that comprises at least one less soliton than that of the generated multiple solitons or (ii) a single soliton in the optical resonator, the third wavelength being shorter than the second wavelength.

According to still another aspect of the present disclosure, the apparatus further includes a photo-detector for receiving the optical resonator light output from the optical resonator and for providing an optical resonator light output signal.

According to yet another aspect of the present disclosure, the apparatus further includes a processor configured to determine the removal of a least one soliton from an optical resonator light output signal.

According to yet another aspect of the present disclosure, the processor is configured to determine the removal of a least one soliton during forward and/or backward tuning from the optical resonator light output signal.

According to yet another aspect of the present disclosure, the processor is configured to control the laser tuning controller to stop tuning when the removal of a least one soliton is determined.

According to yet another aspect of the present disclosure, the processor is configured to control the laser tuning controller to carry out further backward tuning until a single soliton remains in the optical resonator based on determined soliton removals.

According to yet another aspect of the present disclosure, the processor is configured to control the laser tuning controller to backward tune the laser light from the second wavelength to the third wavelength to remove solely one soliton of the generated multiple solitons to provide (i) a plurality of solitons that comprises one less soliton than that of the generated multiple solitons or (ii) a single soliton in the optical resonator.

According to yet another aspect of the present disclosure, the processor is configured to control the laser tuning controller to backward tune the laser light from the third wavelength to lower wavelengths to remove solitons of the plurality of solitons one-by-one to provide a single soliton in the optical resonator.

According to yet another aspect of the present disclosure, the processor is configured to control the laser tuning controller to adiabatically backward tune the laser light.

According to yet another aspect of the present disclosure, the processor is configured to control the laser tuning controller to backward tune the laser light at a tuning speed that is slower than a thermal relaxation rate of the solitons.

According to yet another aspect of the present disclosure, the optical resonator is a crystalline resonator or an on-chip resonator.

According to yet another aspect of the present disclosure, the apparatus further includes a phase modulator for modulating the pumping laser light to non-destructively probe soliton generation in the optical resonator.

According to yet another aspect of the present disclosure, the apparatus further includes a modulation response analyzer for receiving an optical response signal outputted by the optical resonator and configured to determine a modulation response signal representing the response of the optical resonator to the phase modulation of the pumping laser light.

According to yet another aspect of the present disclosure, the apparatus further includes a processor configured to determine, from the modulation response signal, an effective pump detuning value representing the detuning of the pump laser frequency/wavelength from a cavity resonance frequency/wavelength of the optical resonator during the apparatus operation or pumping.

According to yet another aspect of the present, the processor is configured to monitor the effective pump detuning value to maintain a soliton state in the optical resonator.

According to yet another aspect of the present disclosure, the processor is configured to adjust the effective pump detuning value by controlling the laser tuning controller to tune the pump laser frequency/wavelength to maintain a soliton state in the optical resonator.

According to yet another aspect of the present disclosure, the apparatus further includes a processor configured to monitor the evolution of the modulation response signal or the effective pump detuning value while carrying out backward tuning to determine the extinction of one single soliton state in the optical resonator.

According to yet another aspect of the present disclosure, the processor is configured to monitor the evolution of the modulation response signal or the evolution of the effective pump detuning value during backward tuning to determine successive extinctions of individual solitons, and configured to control the laser tuning controller to stop tuning to provide a single soliton in the optical resonator.

According to yet another aspect of the present disclosure, the processor is configured to monitor the effective pump detuning value and to control the tuning device or the laser tuning controller to tune the pump laser frequency/wavelength to maintain the single soliton state in the optical resonator.

According to yet another aspect of the present disclosure, the optical resonator is a crystalline resonator or an on-chip resonator and the apparatus further includes a coupling waveguide optically coupled to the optical resonator, the pumping laser light being provided to the optical resonator via the coupling waveguide.

The soliton generation method preferably includes the steps of:

introducing pumping laser light at a pumping wavelength into an optical resonator;

generating multiple solitons in the optical resonator; and changing the wavelength detuning between the pumping laser wavelength and an optical resonance wavelength of the optical resonator to remove at least one soliton of the generated multiple solitons to provide (i) a plurality of solitons that comprises at least one less soliton than that of the generated multiple solitons or (ii) a single soliton in the optical resonator.

According to another aspect of the present disclosure, the step of changing the wavelength detuning is carried out by applying or removing thermal energy to or from the optical resonator to displace the optical resonance wavelength of the optical resonator towards the pumping wavelength.

According to still another aspect of the present disclosure, the step of generating multiple solitons is carried out by applying or removing thermal energy to or from the optical resonator to displace the optical resonance wavelength of the optical resonator across the pumping wavelength to generate the multiple solitons in the optical resonator.

According to still another aspect of the present disclosure, the method further includes the steps of:

introducing the pumping laser light at a first wavelength into the optical resonator;

forward tuning the pumping laser light from the first wavelength, across a cavity resonance of the optical resonator, to a second wavelength to generate a frequency comb and multiple solitons in the optical resonator, the second wavelength being longer than the first wavelength; and backward tuning the pumping laser light from the second wavelength to a third wavelength to remove at least one soliton of the generated multiple solitons to provide (i) a plurality of solitons that comprises at least one less soliton than that of the generated multiple solitons or (ii) a single soliton in the optical resonator, the third wavelength being shorter than the second wavelength.

According to yet another aspect of the present disclosure, the step of backward tuning the laser light from the second wavelength to the third wavelength removes solely one soliton of the generated multiple solitons to provide (i) a plurality of solitons that comprises one less soliton than that of the generated multiple solitons or (ii) a single soliton in the optical resonator.

According to yet another aspect of the present disclosure, the method further includes the step of backward tuning the laser light from the third wavelength to lower wavelengths to remove solitons of the plurality of solitons one-by-one to provide a single soliton in the optical resonator.

According to yet another aspect of the present disclosure, the backward tuning of the laser light is carried out adiabatically.

According to yet another aspect of the present disclosure, the backward tuning of the laser light is carried out at a tuning speed that is slower than a thermal relaxation rate of the solitons.

According to yet another aspect of the present disclosure, the backward tuning of the laser light is carried out at a constant tuning speed.

According to yet another aspect of the present disclosure, the intensity of the pumping laser light is substantially constant.

According to yet another aspect of the present disclosure, the soliton is a dissipative Kerr soliton and/or the optical resonator is a crystalline resonator or an on-chip resonator.

According to yet another aspect of the present disclosure, the method further includes the step of phase modulating the pumping laser light to non-destructively probe soliton generation in the optical resonator.

According to yet another aspect of the present disclosure, the method further includes the step of measuring an optical response signal outputted by the optical resonator and determining a modulation response signal to non-destructively probe soliton generation in the optical resonator.

According to yet another aspect of the present disclosure, the method further includes the step of determining, from the modulation response signal, an effective pump detuning value representing the detuning of the pump laser frequency/wavelength from a cavity resonance frequency/wavelength of the optical resonator during the apparatus operation or pumping.

According to yet another aspect of the present disclosure, the method further includes the step of monitoring the effective pump detuning value to maintain a soliton state in the optical resonator.

According to yet another aspect of the present disclosure, the method further includes the step of adjusting the effective pump detuning value by tuning the optical resonance wavelength of the optical resonator or the pump laser frequency/wavelength to maintain a soliton state in the optical resonator.

According to yet another aspect of the present disclosure, the method further includes the step of monitoring the evolution of the modulation response signal or the effective pump detuning value while carrying out backward tuning to determine the extinction of one single soliton state in the optical resonator.

According to yet another aspect of the present disclosure, monitoring of the modulation response signal or the evolution of the effective pump detuning value is carried out while carrying out backward tuning to determine successive extinctions of individual solitons and provide a single soliton in the optical resonator.

According to yet another aspect of the present disclosure, the method further includes the steps of monitoring and adjusting the effective pump detuning value to maintain the single soliton state in the optical resonator.

It is another aspect of the present disclosure to provide a soliton probing apparatus including a phase modulator for modulating a pumping laser light to non-destructively probe soliton generation in an optical resonator; and a modulation response analyzer for receiving an optical response signal outputted by the optical resonator and configured to determine a modulation response signal representing the response of the optical resonator to the phase modulation of the pumping laser light.

The above and other objects, features and advantages of the present invention and the manner of realizing them will become more apparent, and the invention itself will best be understood from a study of the following description with reference to the attached drawings showing some preferred embodiments of the invention.

A BRIEF DESCRIPTION OF THE SEVERAL VIEWS OF THE DRAWINGS

Figure 6:
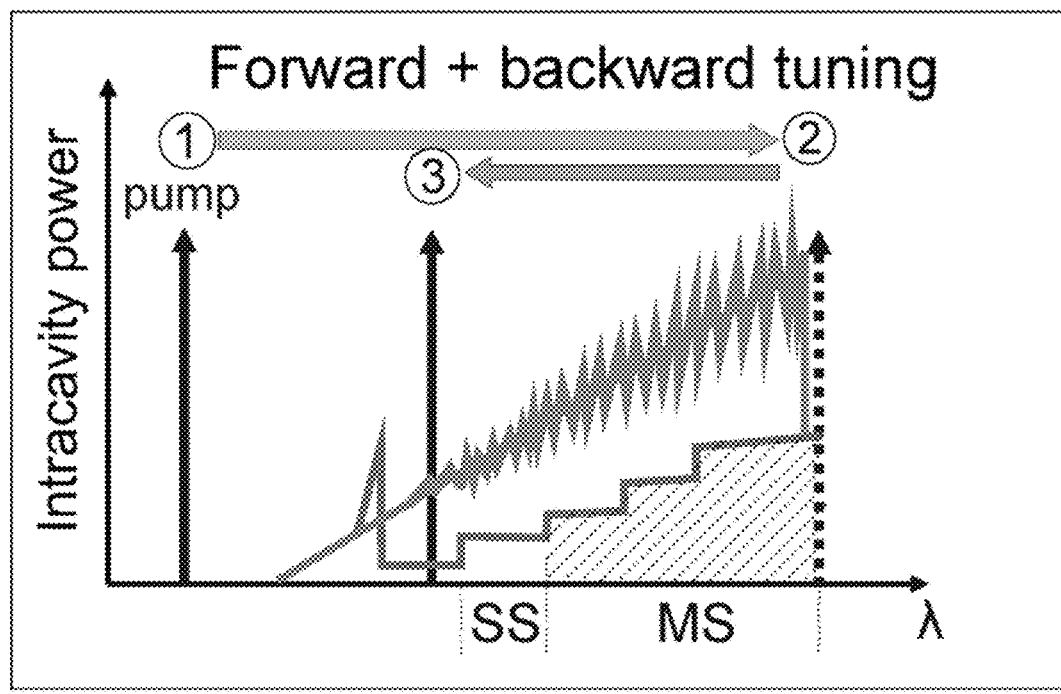
Figure 7:
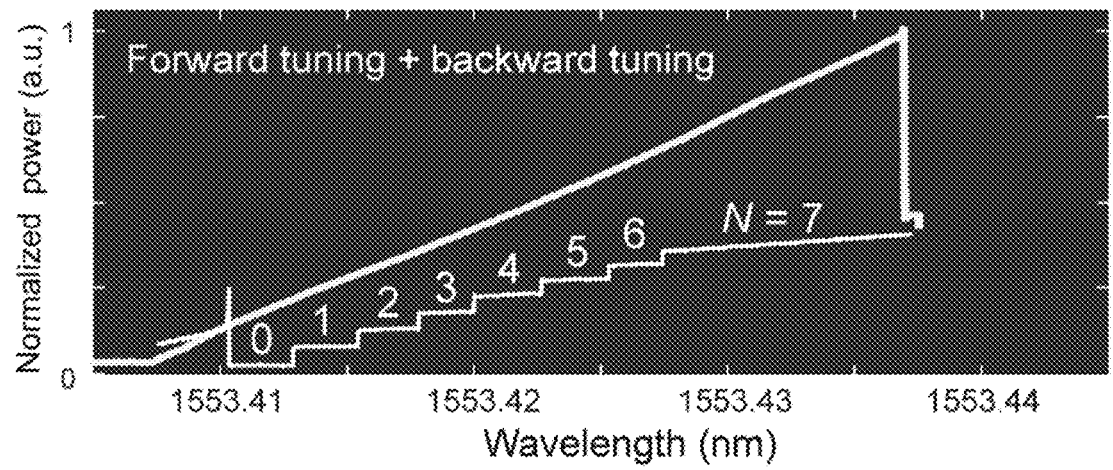
Figure 8:
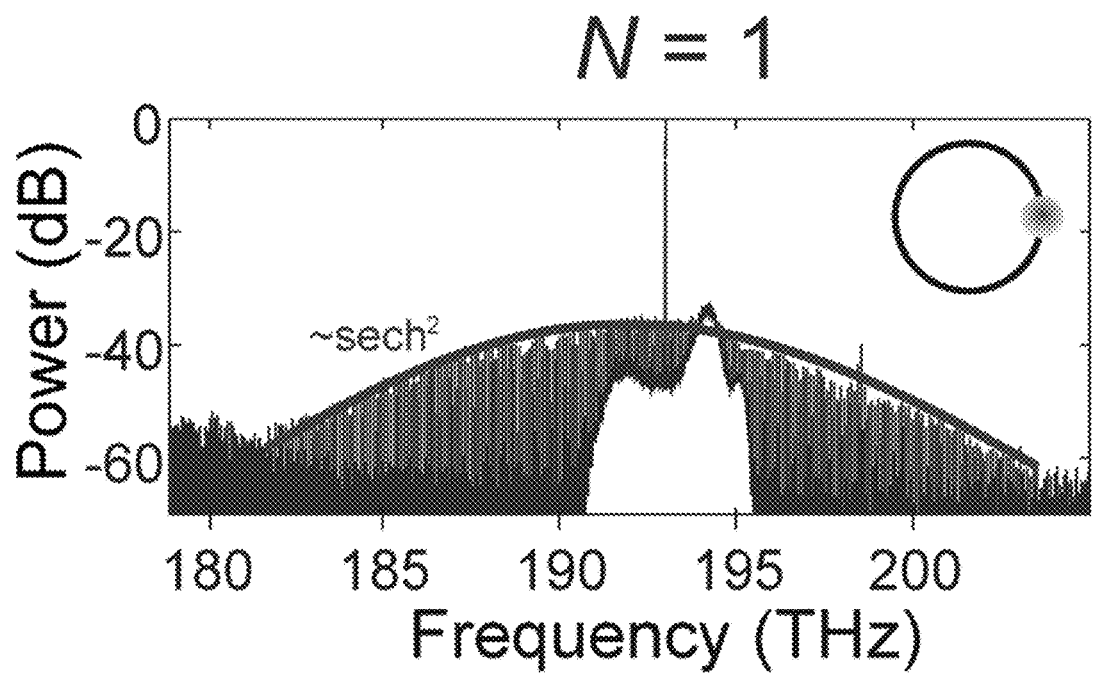
Figure 9:
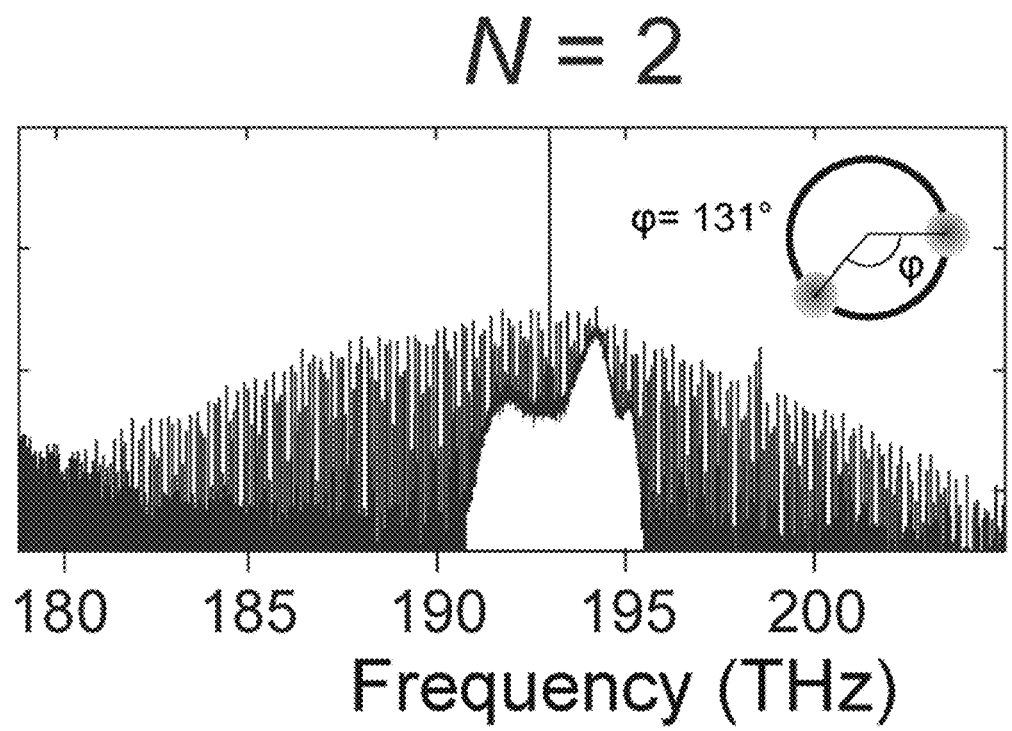
Figure 10:
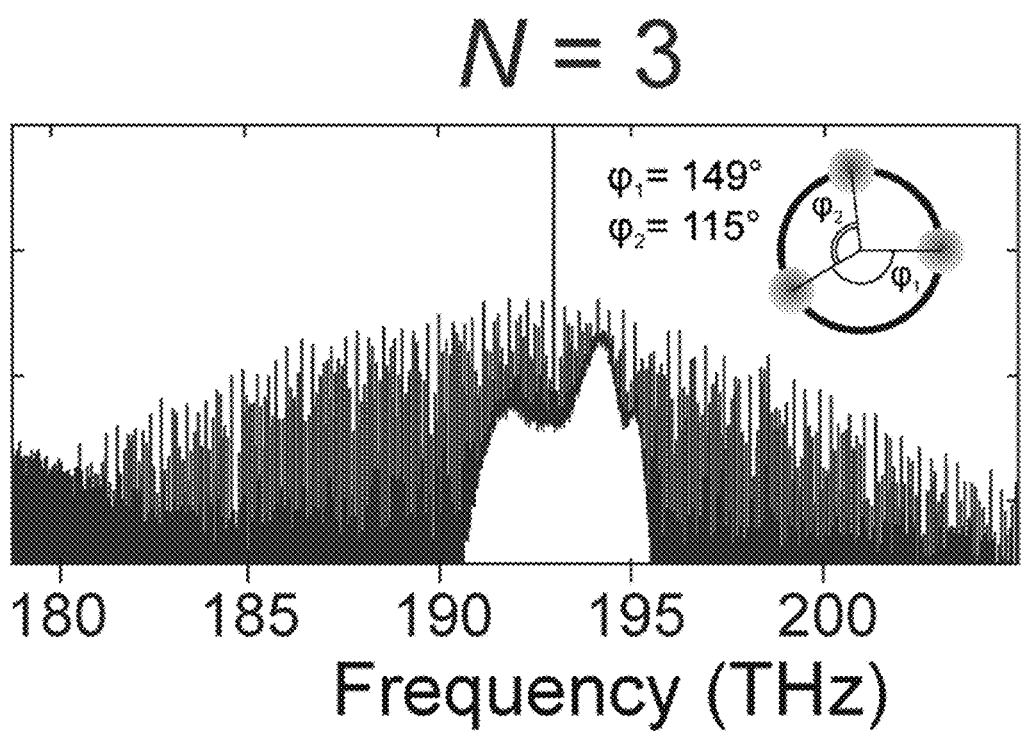
Figure 11A:
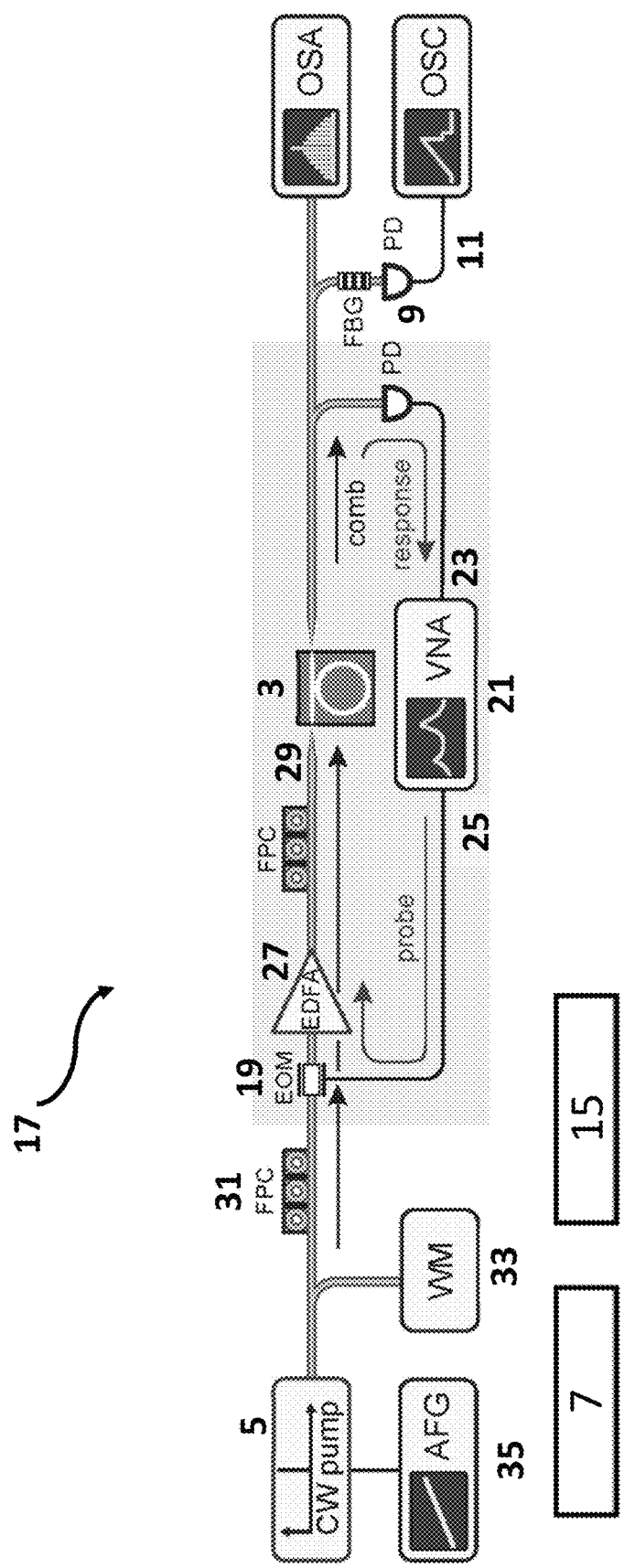
Figure 11B:
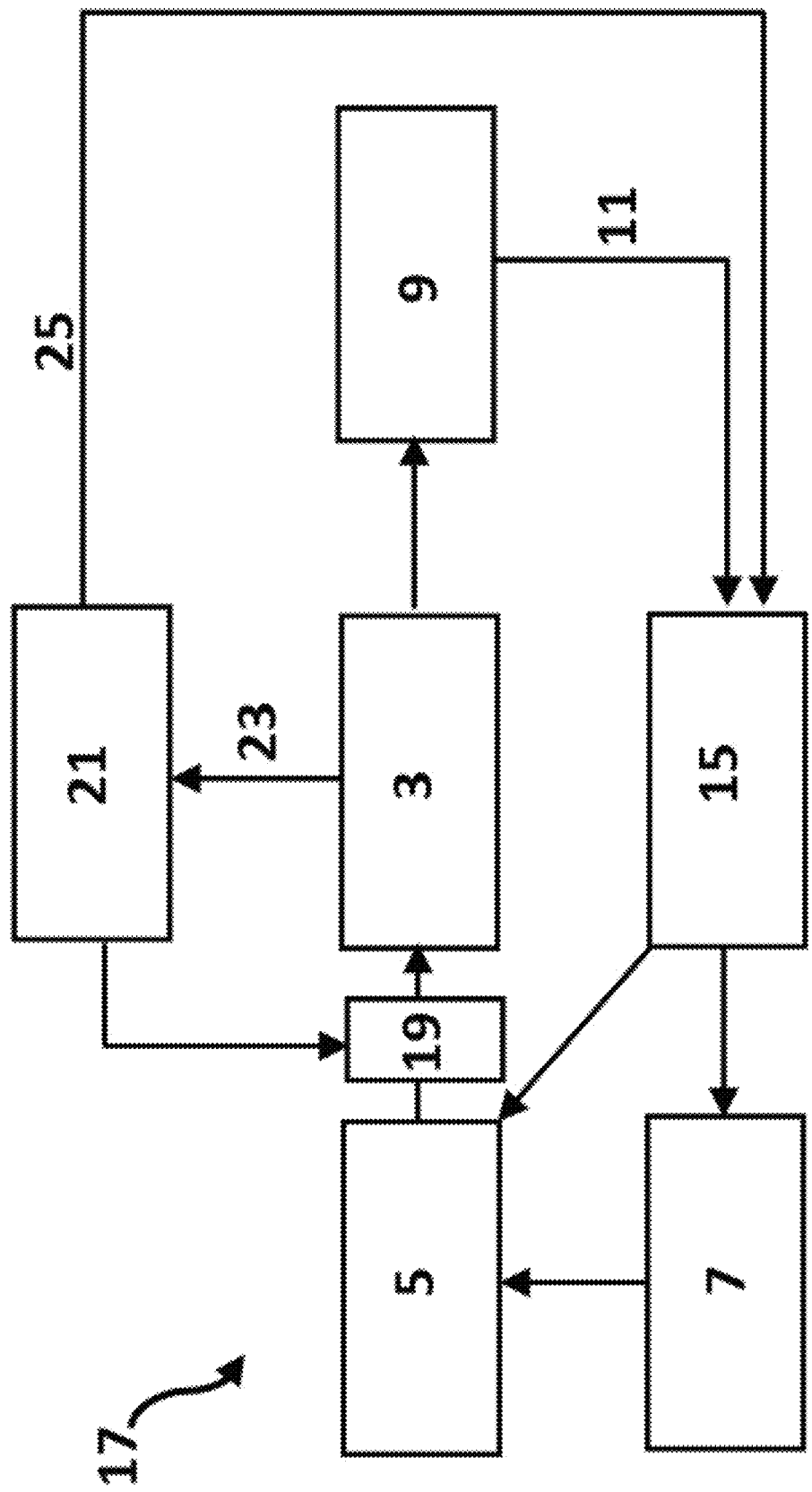
Figure 12:
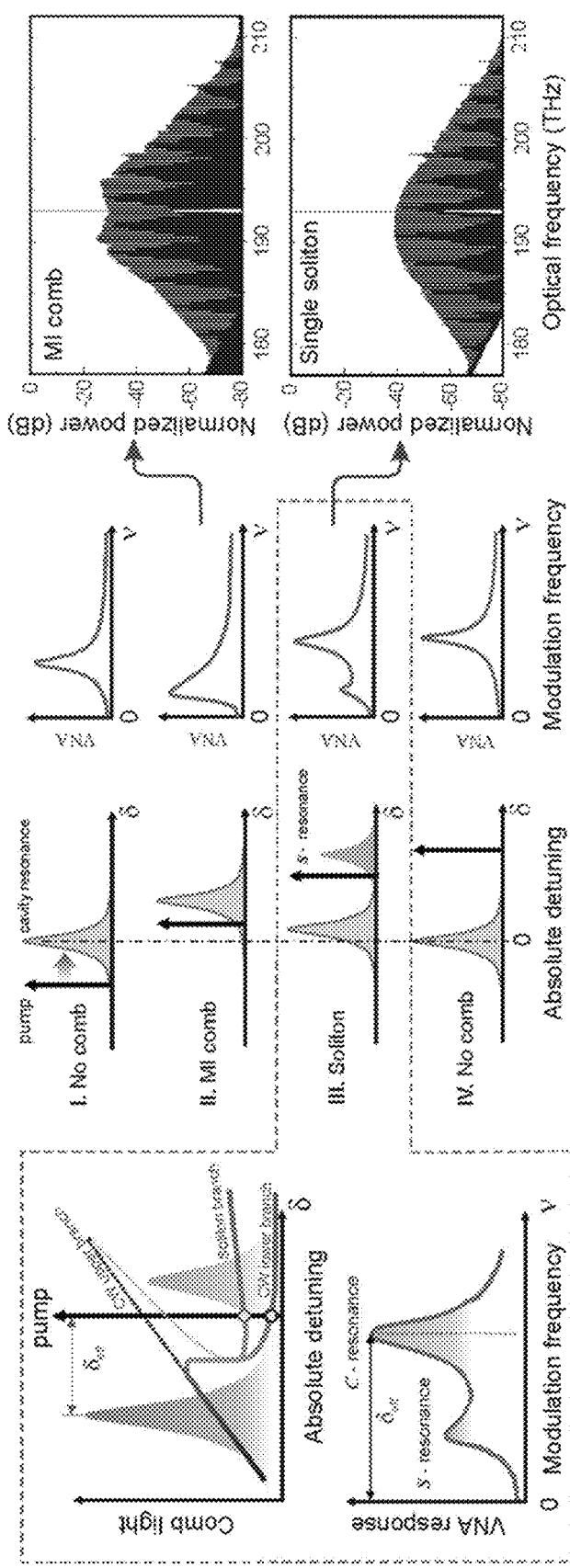
Figure 13:
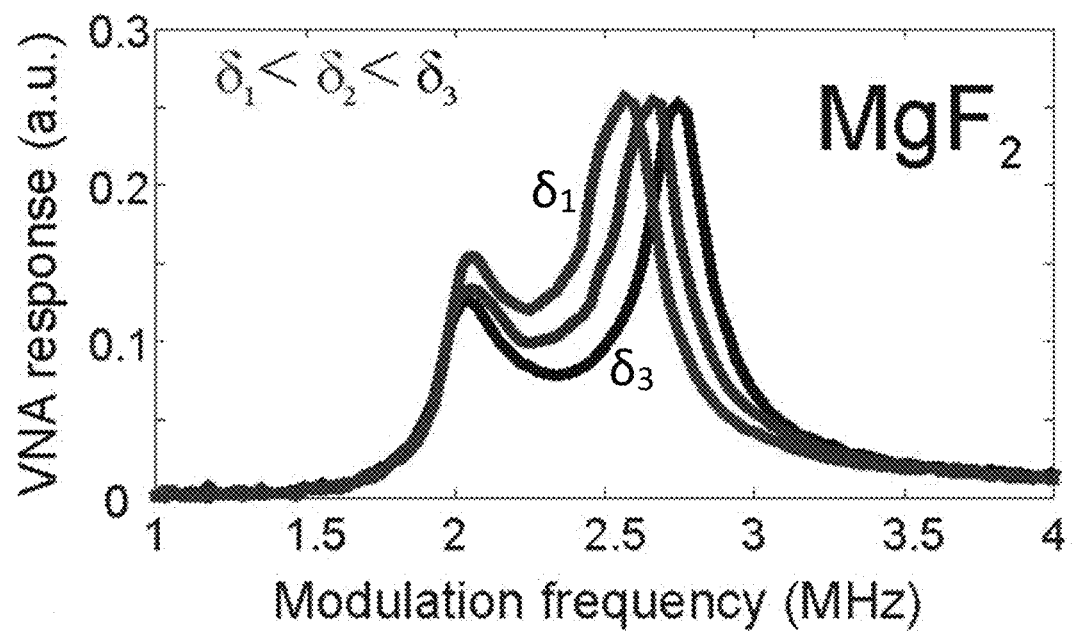
Figure 17:
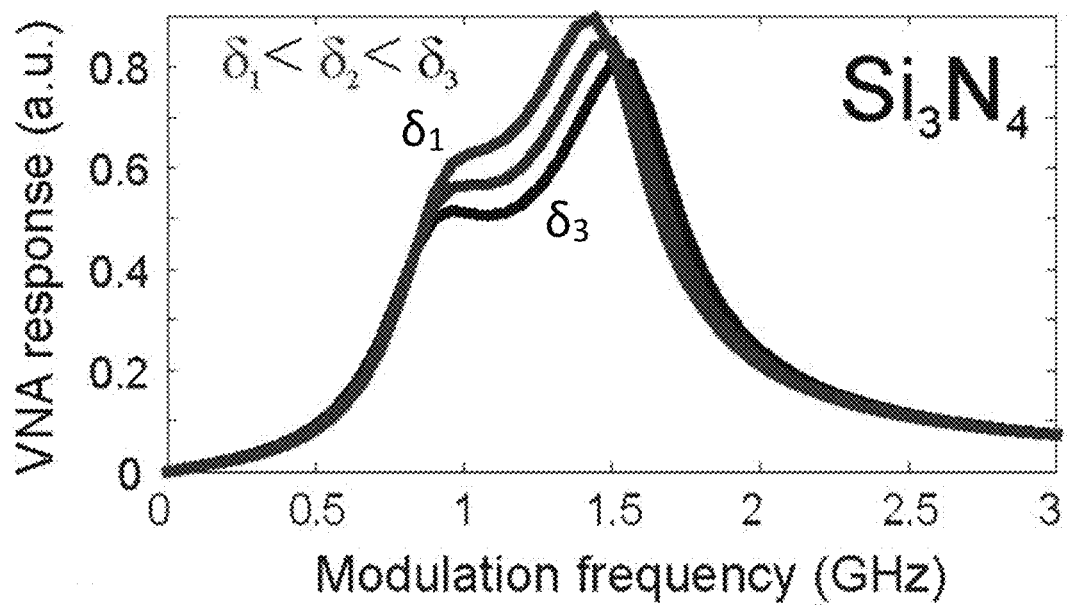
Figure 18:
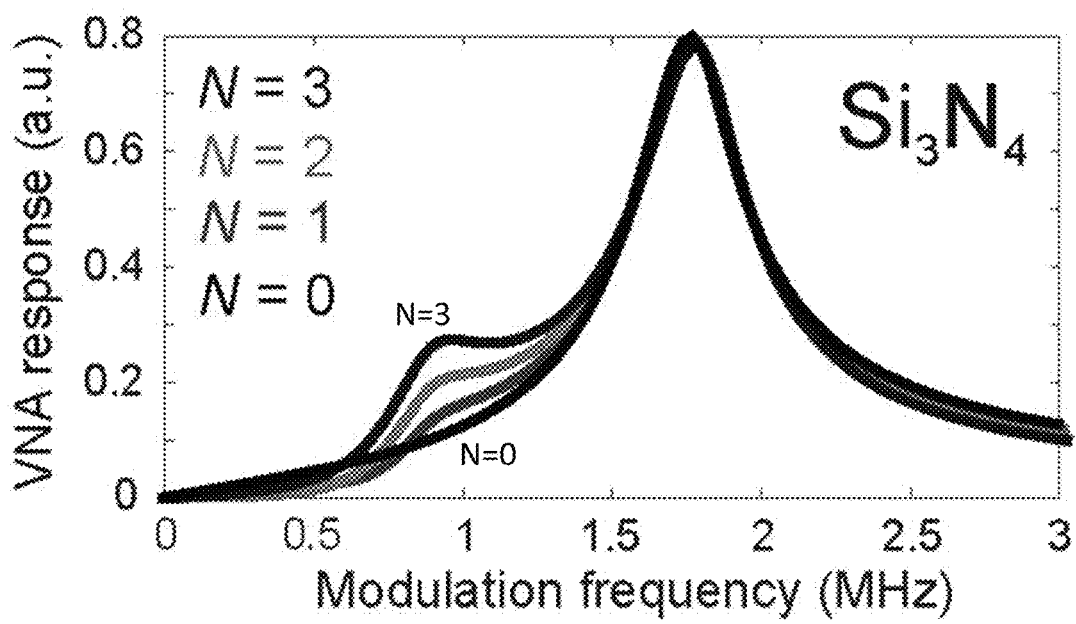
Figure 19:
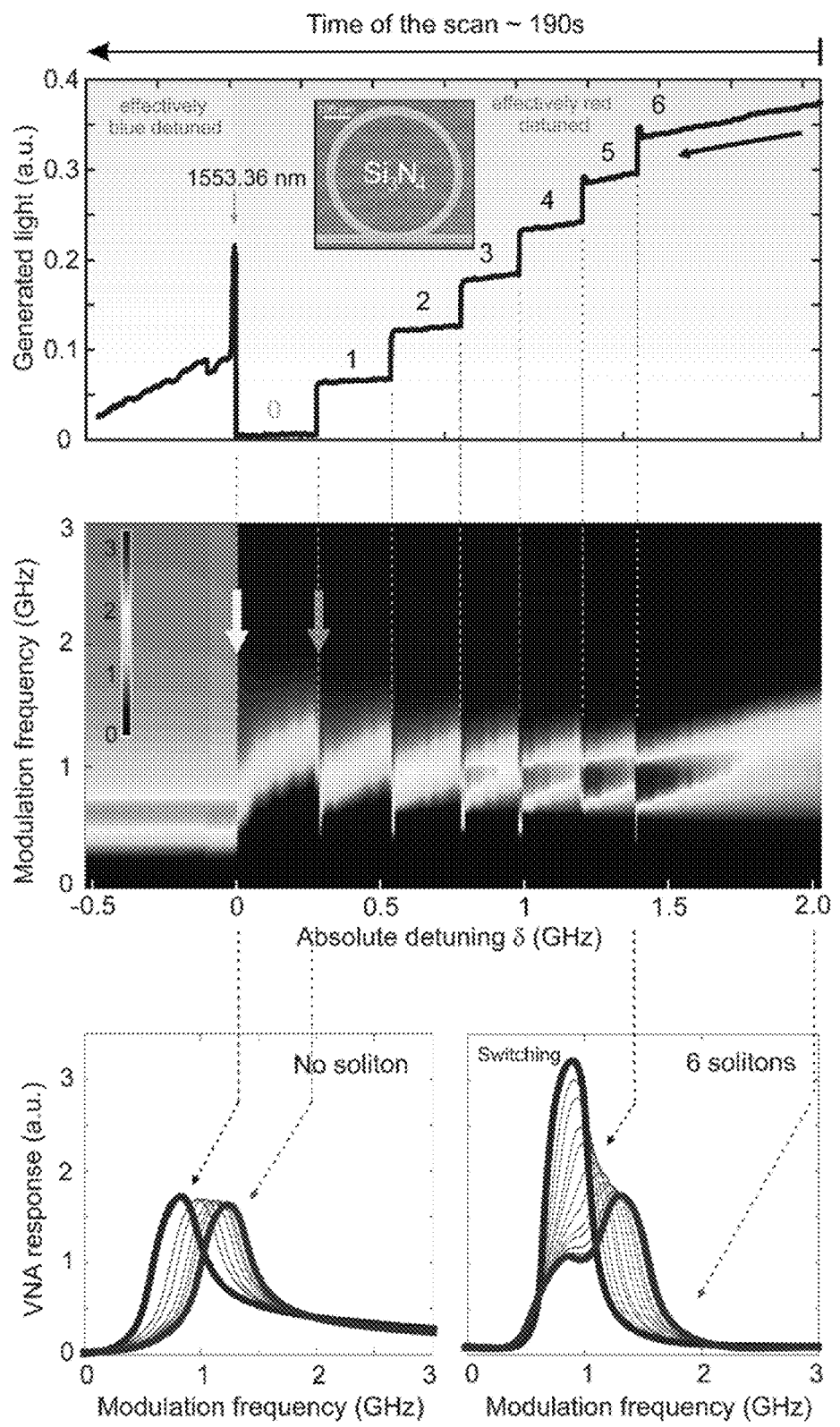
Figure 20:
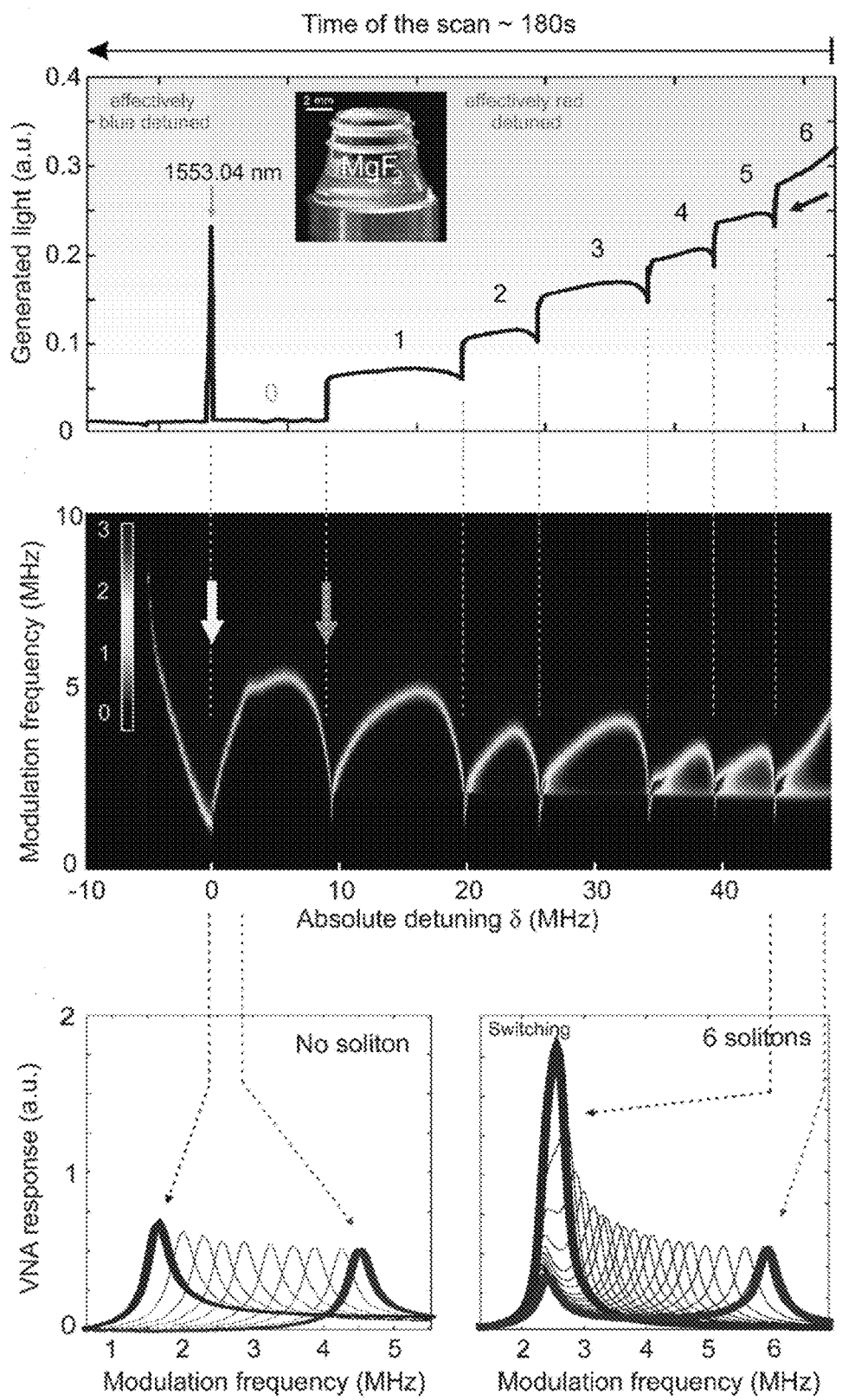
Figure 21:
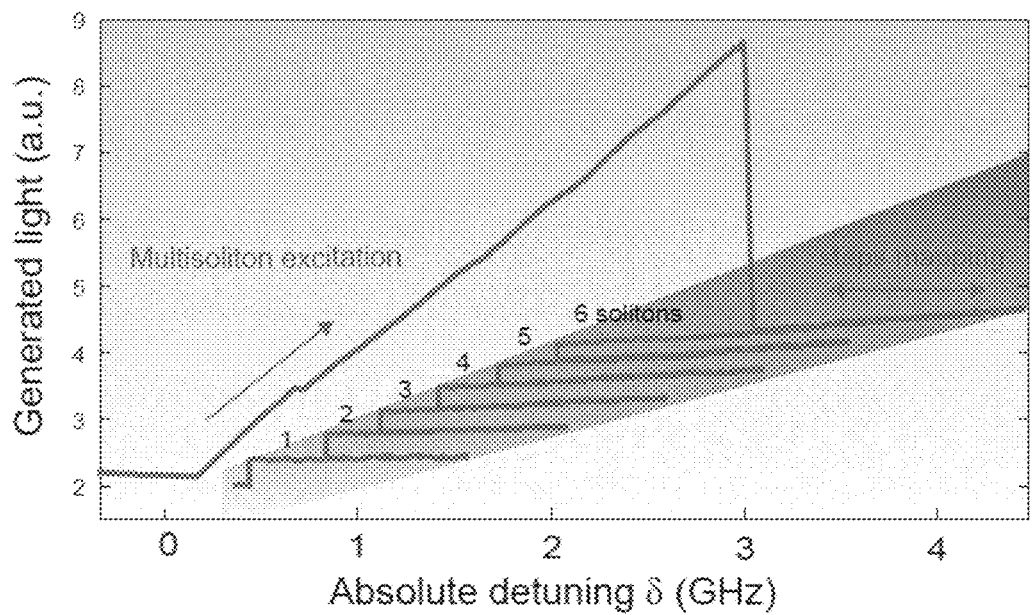

FIG. 6 shows a scheme of the laser backward tuning, where to initiate the sequence, the forward tuning is first applied, and the pump is stopped in a multiple soliton state (which can be stable by suitable choice of the laser tuning speed); in the second stage, the pump is tuned back to short wavelengths, which leads to successive soliton switching, N→N−1→ . . . →1; the MS area indicates the detuning range of multiple soliton states, which is much larger compared to the forward tuning method, there also exists the range of the single soliton state (SS);

FIG. 7 shows a measured experimental trace in the forward tuning (top curve) followed by one trace in the backward tuning (bottom curve) with successive transitions of multiple-soliton states from N=7 to N=0 (no solitons);

FIG. 8 to FIG. 10 show frequency comb spectra in soliton states with N=1, 2, 3, measured during the backward tuning in a 100 GHz $Si_3N_4$ microresonator;

FIG. 11a shows a schematic view of an apparatus according to another embodiment;

FIG. 11b shows an exemplary apparatus or setup scheme used for soliton generation, non-destructive soliton probing and deterministic soliton switching and which includes an external cavity diode laser (CW pump) used as a pump source, an arbitrary function generator (AFG), an erbium doped amplifier (EDFA); a fiber polarization controller (FPC), a wavelength meter (WM), vector network analyzer (VNA), OSA, an optical spectrum analyzer (OSA), an oscilloscope (OSC); photodiodes (PD), an electro-optical phase modulator (EOM), a phase modulator (PD) and a fiber Bragg grating (FBG);

FIG. 12 shows a diagram of the double-resonance modulation response in the soliton state (Left, top) where the power trace of the soliton component is indicated which is evolved from the high-intensity branch of the bistability, the pump is tuned in the bistability range (in the effective-red detuned regime); therefore, both the soliton branch and the low-intensity continuous (CW) branch (bottom line) are supported in the system, each corresponds to a resonance, i.e. the S-resonance and the $C$-resonance; a double-resonance modulation response from VNA is also shown (left, down) in which the high-frequency peak indicates the C-resonance and the low frequency is the S-resonance; Four stages of the microresonator frequency comb formation and corresponding VNA modulation response when the pump laser is forward tuned over the resonance is also shown (middle) with (I) No comb, the pump is blue-detuned; (II) Chaotic MI comb state; (III) Soliton state; (IV) No comb, the pump is red-detuned; Frequency comb spectra corresponding to the chaotic MI operation regime and the single soliton state is also presented (right);

FIG. 13 to FIG. 16 show measured Experimental double-resonance responses of various multiple-soliton states at different detunings for $MgF_2$ and $Si_3N_4$ microresonators;

FIG. 17 and FIG. 18 show simulated double-resonance responses for a $Si_3N_4$ microresonator;

FIG. 19 shows the power trace of the generated light obtained from 100 GHz $Si_3N_4$ microresonator with the backward pump tuning from multiple-soliton with N=6 (effectively red detuned) to the effectively blue detuned regime (top); shows a set of 500 concatenated VNA traces that were taken during the backward tuning, an arrow indicates the transition from a single soliton state to no-soliton state, while the pump is still red detuned with respect to the cavity resonance, a second arrow indicates the transition from the red detuned operating regime to the blue detuned regime (middle); and shows the evolution of the modulation response during the backward tuning process in the effectively red detuned regime, with no soliton presented (N=0) as well as the evolution of the modulation response in the multiple-soliton state with N=6 (bottom);

FIG. 20 shows the power trace of the generated light obtained from 14 GHz $MgF_2$ crystalline resonator with the backward pump tuning from multiple-soliton state with N=6 (effectively red detuned) to the effectively blue detuned regime (top), a set of ~1700 concatenated VNA traces that were taken during the backward tuning are also shown (middle); the Evolution of the modulation response during backward tuning in the state with no soliton is presented as well as the Evolution of modulation response in the multiple-soliton state with N=6 (bottom);

FIG. 21 shows Experimental measurements of the generated comb light with respect to the absolute detuning, a top curve shows the trace in the forward tuning and a bottom curve indicates the entire soliton existence range, Zero absolute detuning corresponds to ~1553.4 nm.

Figure 22:
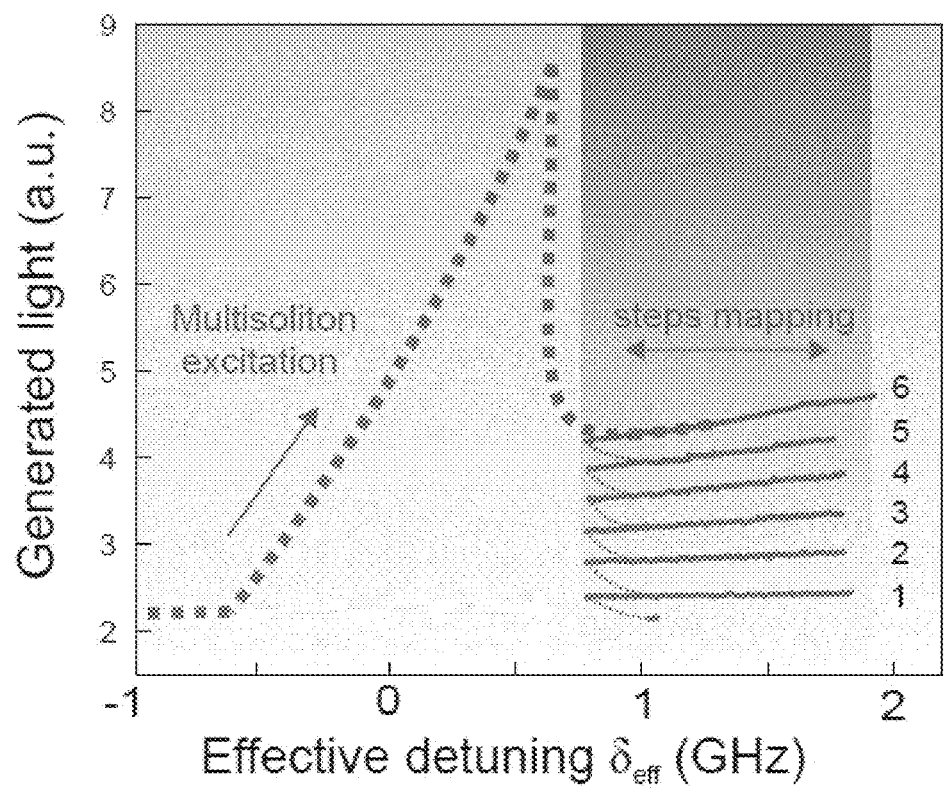
Figure 23:
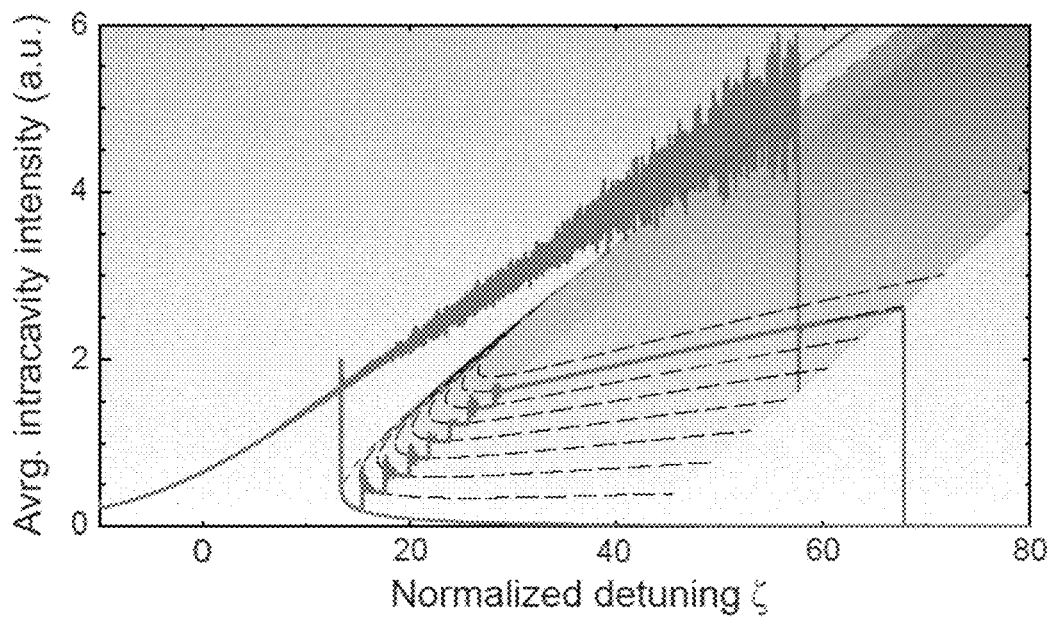
Figure 24:
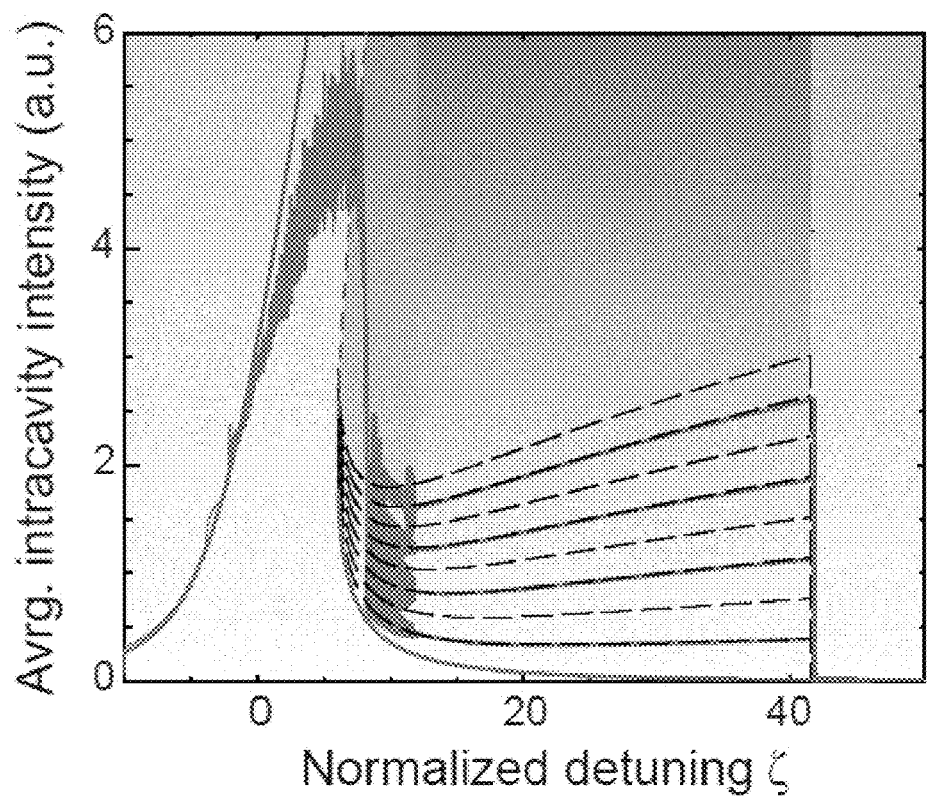

FIG. 22 shows an Experimental trace from FIG. 21 plotted in terms of the effective detuning measured from the modulation response with the VNA, Hypothetical trace of forward tuning is shown in a dashed line, because the effective detuning in this process cannot be reliably measured with the VNA; and FIG. 23 and FIG. 24 show Numerical simulations and analytical solutions of the backward tuning in $Si_3N_4$ with (FIG. 23) and without (FIG. 24) thermal effects where normalized detuning used in the simulation: $\zeta=2(\omega_0-\omega_p)/\kappa$, where $\omega_0$ is the resonance frequency, $\omega_p$ is the pump frequency and $\kappa$ is the resonance linewidth, dashed lines indicate initial excitation of a multiple-soliton state in the forward tuning, solid lines indicate the backward tuning, the stable branch of the nonlinear induced tilted resonance (in the CW mode) is also indicated, dashed lines indicate the unstable branch.

Herein, identical reference numerals are used, where possible, to designate identical elements that are common to the figures.

DETAILED DESCRIPTION OF THE SEVERAL EMBODIMENTS

The present invention relates to a novel mechanism which makes it possible to reduce deterministically the number of solitons, one by one, i.e. N→N-1→ ... →1. By applying for example weak phase modulation, the soliton state is directly characterized via a double-resonance response. The dynamical probing demonstrates that transitions occur in a predictable way, and thereby enables to map experimentally the underlying multi-stability diagram of dissipative Kerr solitons. These measurements reveal the "lifted" degeneracy of soliton states as a result of the power-dependent thermal shift of the cavity resonance (i.e. the thermal nonlinearity). The experimental results are in agreement with theoretical and numerical analysis that incorporate the thermal nonlinearity.

By studying two different microresonator platforms (integrated $Si_3N_4$ microresonators and crystalline $MgF_2$ resonators) it is confirmed that these effects have a universal nature. Beyond elucidating the fundamental dynamical properties of dissipative Kerr solitons, the observed phenomena are also of practical relevance, providing a manipulation toolbox which enables to sequentially reduce, monitor and stabilize the number N of solitons, preventing it from decay. Achieving reliable single soliton operation and stabilization in this manner in optical resonators is imperative to applications.

The present invention allows to induce deterministically transitions to states with less solitons (i.e. from N to N-1), and thereby to reliably reach a single soliton state. The phenomenon is not explained by standard theoretical simulations based on the Lugiato-Lefever equation (LLE) or coupled mode equations models. A detailed analysis of the observed phenomenon is presented, in two microresonator platforms where the thermal locking is possible, and demonstrates its universal nature. The findings allow to switch between multiple-soliton states by sequentially reducing the number N of initially created solitons (with a routine simple enough to be carried out by a micro-controller), to monitor and control the switching, and to hold the targeted soliton state, preventing it from decay.

In particular, the single soliton state can be deterministically and reliably induced, which is imperative to a wide range of applications. The presented results contribute to the physical understanding of switching behavior of the DKS, highlight the influence of thermal effects and provide a rich toolbox for the study of the multiple-soliton dynamics. From an applied perspective, the results present a route to make, for example, reliable pulse sources and frequency combs based on DKS at microwave repetition rates in optical microresonators.

Figure 1A:
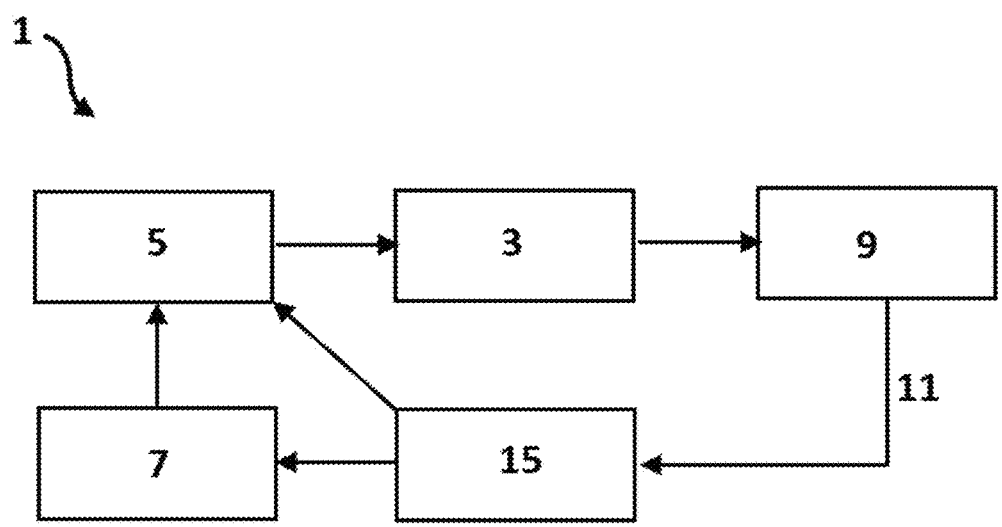
FIG. 1a shows a schematic view of an apparatus according to one embodiment.

One embodiment of the present disclosure concerns an apparatus and method for soliton generation. FIG. 1a schematically illustrates an example of such an apparatus 1. The soliton generation apparatus 1 can include an optical resonator 3, a pumping optical source such as a pumping laser 5 for providing light at a first wavelength into the optical resonator 3 and a tuning device 7. According to one embodiment, the tuning device 7 comprises or is, for example, a laser tuning controller 7 configured to forward tune the pumping laser 5 to tune the pumping laser light from the first wavelength, across a cavity resonance of the optical resonator 3, to a second wavelength to generate a frequency comb and multiple solitons in the optical resonator 3, where the second wavelength is longer than the first wavelength.

A non-limiting example of the laser tuning controller 7 is a (internal) motor which is activated to move a cavity mirror of the laser to carry out tuning, for example, course tuning of the laser cavity. Finer tuning can be implemented using a piezo element which provides smooth and precise tuning of the mirror by applying a voltage. The pumping laser can be for example a tunable External Cavity Diode Laser (ECDL) that includes such control systems embedded. Alternatively, the laser can be tuned using alternative ways such by a heater or a MEMS structure for tuning the cavity length. An array of lasers, each at a different wavelength, can be used with switching between lasers being used to changes the wavelength in a coarse manner and a heater being used for fine tuning.

The laser tuning controller 7 is also configured to backward tune the pumping laser light from the second wavelength to a third wavelength to remove at least one soliton of the generated multiple solitons to provide either a plurality of solitons that comprises at least one less soliton than that of the generated multiple solitons or a single soliton in the optical resonator 3, where the third wavelength is shorter than the second wavelength.

According to another embodiment, the detuning device 7 is or comprises, for example, a thermal tuner configured to apply or remove thermal energy to or from the optical resonator 3 to displace the optical resonance wavelength of the optical resonator 3 towards the pumping wavelength. The thermal tuner 7 is configured to apply or remove thermal energy to or from the optical resonator 3 to displace the optical resonance wavelength of the optical resonator 3 across the pumping wavelength to generate the multiple solitons in the optical resonator 3. Non-limiting examples of the thermal tuner are a peltier element or for example a simple resistive heater (temperature increased by applying a voltage to a high-resistance element) which can be a separate device or even deposited on the resonator 3.

Figure 5:
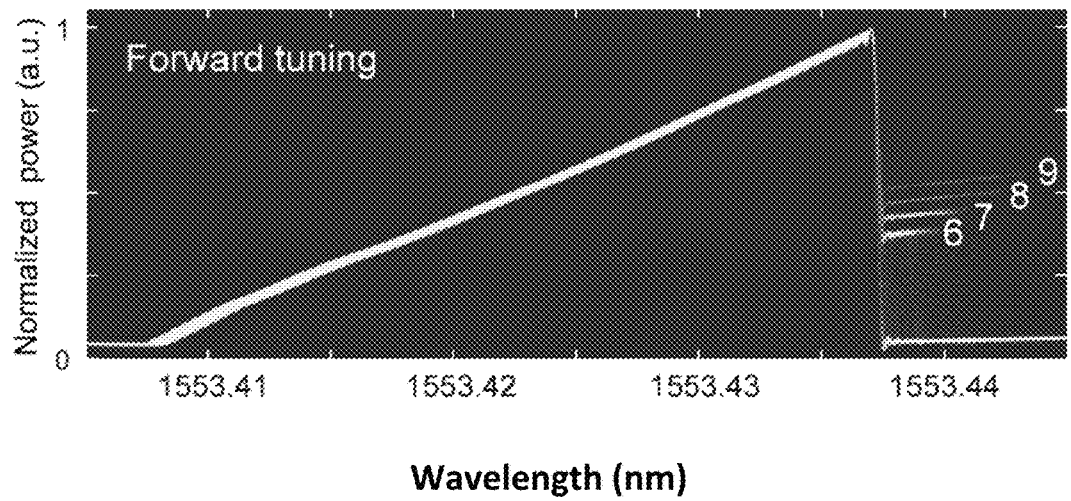
FIG. 5 is a histogram plot of 200 overlaid experimental traces of the output comb light in the pump forward tuning over the resonance with the same pump power and tuning speed, which reveals the formation of a predominant multiple soliton state with N=6; the noise pattern in the forward detuning was not captured by the measurements due to the averaging in the photodetector.

The apparatus 1 may also further include a photo-detector 9 for receiving the optical resonator light output from the optical resonator 3 and for producing a corresponding output signal 11 that is received by a processor or micro-controller 15. FIG. 7 shows an example of such a signal 11. The processor 15 is configured to process the signal 11 determine the removal of a soliton from an optical resonator light output signal. This is done, for example, through the identification of a step profile in the signal 11. The processor 15 is also configured to determine the removal of a soliton during both forward and backward tuning of the laser pump wavelength from the optical resonator light output signal. This is done, for example, during forward tuning through the identification of a step profile in the signal 11 as shown in FIG. 5. The processor 15 is configured to control the tuning device, for example, the laser tuning controller 7 to carry out forward and backward tuning, and to stop backward tuning when the removal of one soliton is determined from the signal 11. The processor 15 controls the backward or forward laser tuning controller 7 to tune until a single soliton remains in the optical resonator based on determined soliton removals using the processed signal 11.

The processor 15 is configured to control the laser tuning controller 7 to backward tune the laser light from the second wavelength to the third wavelength to remove solely one soliton of the generated multiple solitons based on signal 11 to provide a plurality of solitons that comprises one less soliton than that of the initially generated multiple solitons or to provide a single soliton in the optical resonator 3.

The processor 15 is configured to control the laser tuning controller 7 to backward tune the laser light from the third wavelength to lower wavelengths to remove solitons of the plurality of solitons one-by-one by processing the signal 11 to identify each soliton extinction in order to provide a single soliton in the optical resonator 3.

The processor 15 is configured to control the laser tuning controller 7 to adiabatically backward tune the laser light. The processor 15 can also control the laser tuning controller 7 to backward tune the laser light at a tuning speed that is slower than a thermal relaxation rate of the solitons.

The apparatus includes a memory containing a routine or algorithm permitting to processor 15 to operate as indicated above. However, the soliton generation method disclosed herein can alternatively be carried out without such a commanding processor by an apparatus user.

Figure 1B:
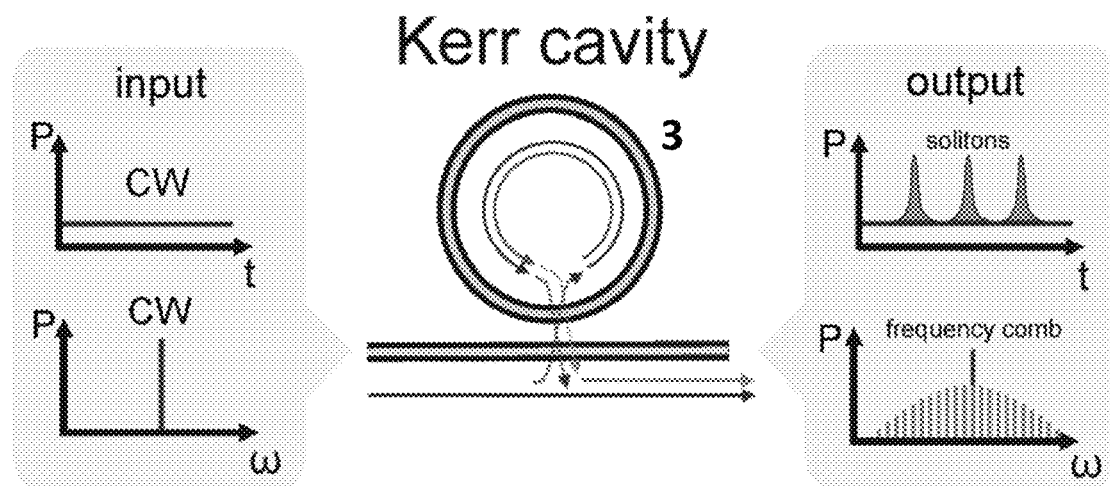
FIG. 1b shows the principle of microresonator frequency comb generation and the formation of dissipative Kerr solitons.

The principles of microresonator frequency comb generation and the formation of dissipative Kerr solitons (DKS) are shown in FIG. 1b. CW laser light is coupled to a high-Q optical resonator 3, where modulation instability (MI) and cascaded four-wave-mixing processes lead to the formation of a broadband frequency comb.

Two exemplary microresonator platforms 3: $Si_3N_4$ on-chip ring microresonators (FIG. 2) and $MgF_2$ crystalline resonators (FIG. 3) are disclosed herein.

The $Si_3N_4$ microresonator (FIG. 2) was fabricated using the Photonic Damascene process described in reference [38] listed below and fully incorporated herein by reference. The microresonator has FSR of 100 GHz. A single mode "filtering" section was added to the micro-rings in order to suppress high-order modes (see reference [39] fully incorporated herein by reference). The $Si_3N_4$ microresonator can also be fabricated using the process described in US patent application US2016/0327743 fully incorporated herein by reference.

The dispersion parameters of the microresonators are measured using the frequency comb assisted laser spectroscopy method (as set out in reference [40]): $D_2/2\pi = 1-2$ MHz, $D_3/2\pi=0$ (1 kHz) (where the resonance frequencies near $\omega_0$ are expressed in a series $\omega_\mu=\omega_0+\Sigma_{i\geq 1}D_i\mu^i/i!$, where $i\in\mathbb{N}$, $\mu\in$ is the mode number). Pumped resonance is at 1553.4 nm. Tuning speed for soft excitation is ~1 nm/s. Pump power is ~2-3 W on a chip.

The $MgF_2$ crystalline resonator (FIG. 3) was fabricated by diamond turning of a cylinder blank and subsequent hand polishing to achieve high Q $$\left(\text{linewidth } \frac{\kappa}{2\pi}=100 \text{ kHz}\right).$$

The diameter of 5 mm yields a FSR $D_1/2\pi=14$ GHz. The dispersion parameters at the pump wavelength of 1553 nm are: $D_2/2\pi=1.9$ kHz, $D_3/2\pi=0$ (1 Hz). The pump laser (fiber laser, wavelength 1553 nm; short-term linewidth 10 kHz) is amplified to ~250 mW. The relative laser frequency is monitored by counting the heterodyne beat between the pump laser and a reference laser stabilized to an ultra-stable cavity. The light is evanescently coupled to a WGM with a tapered optical fiber.

The laser tuning technique was developed as an effective method to the formation of dissipative Kerr solitons, in which the CW pump laser 5 is tuned (from short to long wavelengths) over the cavity resonance, referred to as the "forward tuning". Initially, the CW pump is in the blue detuned regime. The cavity resonance is shifted due to the slow thermal and fast Kerr nonlinearity of the microresonator, resulting in a self-locking of the cavity resonance to the pump laser 5. In this regime the Kerr comb formation can be observed. The mechanism results in a triangular trace in the generated comb light, over the pump frequency detuning. When the pump is tuned over the cavity resonance, it enters the effectively red-detuned regime where multiple dissipative Kerr solitons (i.e. multiple-solitons) can be formed. The soliton state is accompanied with a step-like power trace in the generated comb light, where the step height corresponds to the number of solitons (N) inside the resonator.

Figure 4:
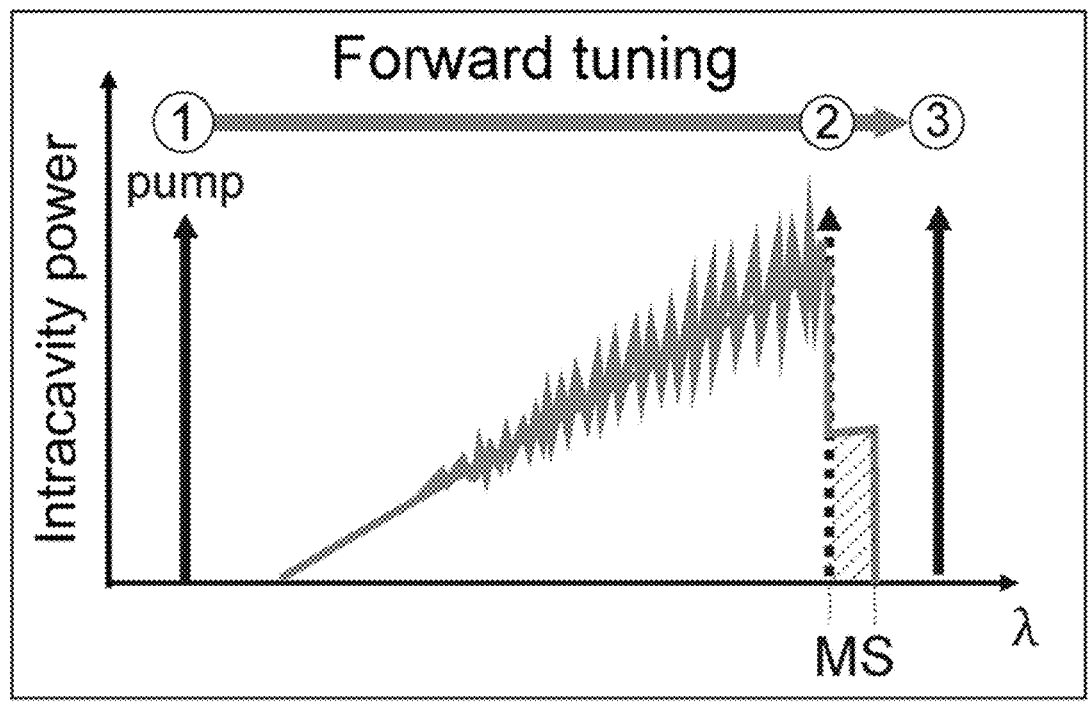
FIG. 4 shows a scheme of a laser tuning method for the soliton generation in optical microresonators where the pump laser is tuned over the resonance from short to long wavelengths (forward tuning), the hatched region indicates the pump detuning range of multiple solitons (MS)

Transitions to states with lower number of solitons may also occur and the power trace will exhibit a characteristic steps. Eventually, by stopping the pump laser 5 tuning at a step while ensuring the thermal equilibrium in the resonator, stable multiple-soliton and even single soliton states can be accessed (FIG. 4). This forward tuning method was applied in $MgF_2$, $Si_3N_4$ and silica resonators 3 for single dissipative Kerr soliton generation.

Remarkably, an additional laser tuning towards shorter wavelengths ("backward tuning") provides a way to reliably access the single soliton state starting from an arbitrary multiple soliton state. The result of this backward tuning sequence, shown in FIG. 6 and FIG. 7, allows for successive extinction of intracavity solitons (soliton switching) down to the single soliton state ($N\rightarrow N-1\rightarrow \ldots \rightarrow 1$).

FIG. 7 shows one trace of the generated light of the $Si_3N_4$ microresonator 3, where switching from seven solitons to the single soliton is observed. Strikingly, the power trace of the generated comb light reveals a regular staircase pattern with equal stair length and height. The exact soliton number in each step can be precisely inferred from the step height. The pattern is almost identical over multiple experimental runs (using the same tuning speed and pump power) regardless of the initial soliton number N. Each transition between multiple-soliton states occurs with the extinction of preferably one soliton at a time, which is confirmed by the relative positions of the intracavity solitons that are retrieved from the optical spectrum as shown in FIGS. 8 to 10.

The backward tuning process should preferably be adiabatic to induce the successive reduction of the soliton number: the thermal equilibrium is required at each multiple-soliton state. This is satisfied by choosing a tuning speed much slower than the thermal relaxation rate that depends on the effective mode volume and the thermal diffusivity of a microresonator 3. For the $Si_3N_4$ microresonator 3, the exemplary backward tuning speed is chosen ~40 MHz/s, while the exemplary forward tuning speed is ~100 GHz/s. In this way, all soliton states ($\leq N$) are deterministically accessible. In contrast to the robust backward tuning that enables successive extinction of intracavity solitons, the forward tuning in $Si_3N_4$ microresonators 3 leads to collective extinction of solitons.

The backward tuning was also carried out in $MgF_2$ crystalline microresonators 3, where the successive soliton switching to the single soliton state is also achieved. In contrast to the $Si_3N_4$ platform, the single soliton state can directly be accessed with the forward tuning in $MgF_2$ microresonators 3. However, this requires fine adjustments on the coupling, the pump power and the tuning speed. The backward tuning, on the other hand, is much more robust and significantly facilitates the generation of single soliton states for crystalline resonators 3.

The soliton switching in both $Si_3N_4$ and crystalline $MgF_2$ resonator 3, proves that the backward tuning represents a universal approach to the generation of a single soliton state in microresonators, provided that the thermal locking can be achieved.

Dissipative Kerr solitons in microresonators represent stable and self-reinforcing intracavity light patterns resulting from double balance between pump and cavity losses, as well as chromatic dispersion and Kerr nonlinearity of the resonator. The key parameter of such soliton state is the effective laser frequency detuning that determines both the amplitude and the duration of soliton pulses.

This detuning is defined as $2\pi\delta_{eff}=\omega_0-\omega_p$, where $\omega_0$ indicates the frequency of a cavity resonance and $\omega_p$ is the pump laser frequency. The pump frequency can be precisely controlled, but the resonance frequency is thermally shifted from the initial cold cavity resonance frequency $\omega_0$, making it a priori not possible to evaluate the effective detuning.

On the other hand, the absolute detuning $2\pi\delta=\omega_0-\omega_p$ can be introduced and measured as the position of the pump frequency relative to the fixed cold cavity resonance. It has been shown that solitons are supported within a certain range of the effective detuning, when the pump is effectively-red detuned ($\omega_p<\omega_0$), which is here referred to as the soliton existence range for a given constant input power.

According to another aspect of the present disclosure, a non-destructive soliton probing scheme and apparatus has been developed that allows to track the effective detuning and extract the soliton number N of microresonator frequency combs. An exemplary apparatus setup 17 is presented in FIG. 11a and schematically shown in FIG. 11b.

As shown in FIG. 11b, the apparatus may include the elements of the apparatus 1 (illustrated in FIG. 1a) and additionally include a phase modulator 19 for modulating the pumping laser light to non-destructively probe soliton generation in the optical resonator 3 and also include a modulation response analyzer 21 for receiving an optical response signal 23 outputted by the optical resonator 3 and for determining a modulation response signal 25 to non-destructively probe soliton generation in the optical resonator 3. The modulation response signal 25 represents the response of the optical resonator 3 to the phase modulation of the pumping laser light.

The processor 15 is configured to determine, from the modulation response signal 25 provided by the modulation response analyzer 21 to the processor 15, the effective pump detuning value representing the detuning (during pumping) of the pump laser wavelength from a cavity resonance wavelength of the optical resonator 3. This is done for example by determining the C-resonance in the modulation response signal 25 (see FIG. 12) as detailed further below. To maintain a soliton state in the optical resonator 3, the processor 15 is further configured to monitor the effective pump detuning value and to adjust the measured effective pump detuning value by controlling the laser tuning controller 7 to tune the pump laser wavelength. This allows the effective pump detuning value to be adjusted to a value or to within a range that permits to maintain the soliton state in the optical resonator 3.

The processor 15 can be configured to monitor the evolution of the modulation response signal 25 or the effective pump detuning value while carrying out backward tuning via the controller 7 to determine the extinction of a single soliton state in the optical resonator 3. Successive single soliton state extinctions can be determined and the laser tuning controller 7 can be controlled to stop tuning when a desired number of solitons or a single soliton is determined to be present in the optical resonator 3. The processor 15 can be further configured to then monitor the effective pump detuning value and to control the laser tuning controller 7 to tune the pump laser wavelength to maintain the multiple solitons or the single soliton state in the optical resonator 3.

The apparatus 17 includes a memory containing a routine or algorithm permitting to processor 15 to operate as indicated above. However, the soliton generation method disclosed herein can alternatively be carried out without such a commanding processor by an apparatus user.

FIG. 11a shows further details of one possible exemplary embodiment of the apparatus 17. It is to be noted that not all the shown elements are necessary in the apparatus 17 to carry out the present invention. The $Si_3N_4$ resonator 3 is pumped with a CW laser light from an external-cavity diode laser 5 amplified by an erbium-doped fiber amplifier 27 (EDFA) to 3 to 5 W. The CW pump 5 is coupled to the on-chip resonator 3 using lensed fibers 29 with coupling losses of 2.5-3 dB per facet.

Figure 2:
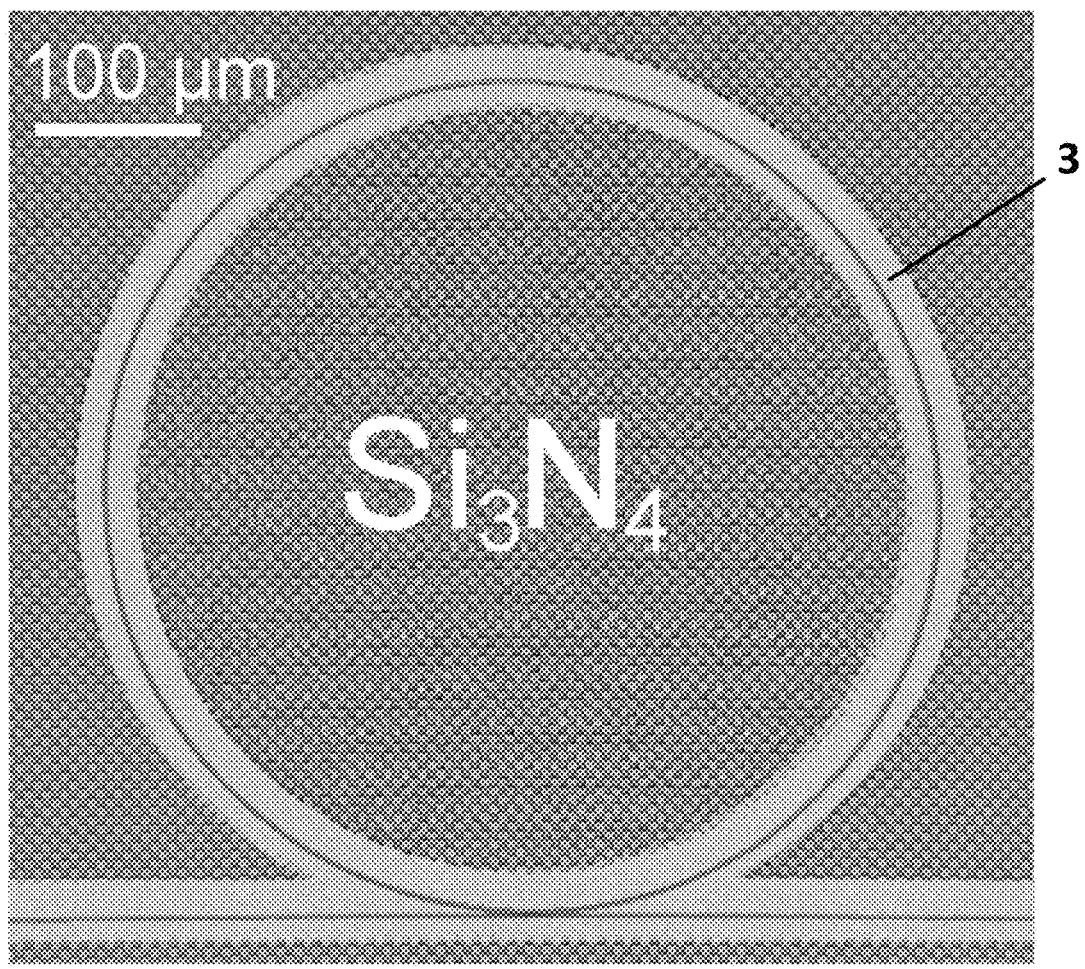
FIG. 2 shows SEM image of a $Si_3N_4$ on-chip microresonator with a free spectral range (FSR) of 100 GHz.
Figure 3:
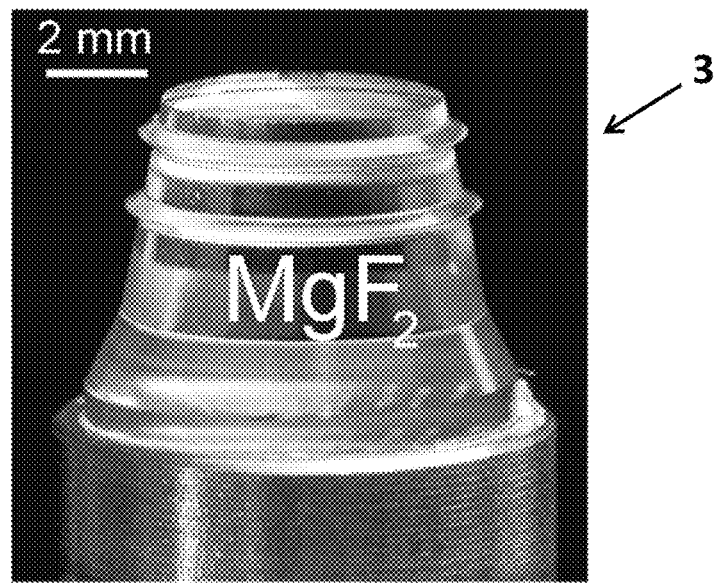
FIG. 3 is a picture of a $MgF_2$ crystalline resonator with FSR of 14 GHz.

The $Si_3N_4$ resonator 3 includes a substantially circular or ring SiN waveguide section and a $SiO_2$ cladding as shown in FIG. 2. The SiN microresonator studied has a waveguide height of 0.8 µm and a nominal width of 1.5 µm. The waveguide section includes a tapered section where the taper waist ranges from 0.5 µm to the nominal width and the taper length is fixed to be 180 µm.

For soliton probing measurements, a 10 GHz electro-optical phase modulator (EOM) 19 is placed before the EDFA 27 with additional polarization controller 31 for adjusting input polarization. The pump frequency wavelength in the pump backward tuning is measured by a wave-meter 33 with resolution of ~50 MHz. For the long sweeps, an arbitrary function generator 35 is used.

The output signal from the chip 3 is split in several paths among the optical spectrum analyzer OSA (for the measurements of combs spectra), the oscilloscope OSC (for the measurements of generated light by filtering out the pump with FBG) and a vector network analyzer (VNA) receiver 21 (for the measurements of and modulation response).

As shown in the exemplary set-up of FIG. 11a, the apparatus 17 employs the pump laser 5, whose frequency is phase modulated using a phase modulator 19 and a vector network analyzer (VNA), that produces weak optical sidebands with sweeping frequency (v) in the range 5 kHz-4.5 GHz, which probe the state of the microresonator system 3. The complex modulation response 25 to such probes is measured and determined by the modulation response analyzer 21 which is the VNA.

This non-destructive probing method is based on the measurement of the frequency-dependent S21 parameter of the optical resonator. The input signal of the system in this case is presented by the RF-modulation of the CW-pump (before entering the resonator), and the output signal is the modulation response of transmitted optical intensity measured with the high-speed photodiode. A 2-port vector network analyzer (VNA) is, for example, used in the S21 measurement regime, where port-1 was connected to the EOM (phase modulator), to provide a phase modulation of the CW pump, and the transmitted optical intensity was detected with a 25-GHz photodiode connected to port-2 of the VNA for the measurements of the modulation response.

This probing method enables to identify different stages in the generation of frequency comb, including the soliton formation, see FIG. 12. First (FIG. 12-I), when the pump is in the blue-detuned regime ($\omega_p > \omega_0$), away from the cavity resonance, the modulation response 23 on the VNA 21 shows a Lorenzian-like resonance profile that corresponds to the cavity resonance with the peak position indicating $|\delta_{eff}|$. Second (FIG. 12-II), when (forward) tuning the pump frequency into the cavity resonance, where the frequency comb in the chaotic MI regime is observed, the modulation response shows an asymmetric profile with the peak position being fixed, indicating the thermal and Kerr locking of the cavity resonance to the pump frequency. Third (FIG. 12-III), when the frequency comb is in the soliton state, with the pump laser tuned in the soliton existence range in the red-detuned regime, the modulation response shows unexpectedly a double-resonance feature. Finally (FIG. 12-IV), when the pump frequency is tuned out of the soliton existence range where no comb is observed, the modulation response shows again a single, Lorenzian-like resonance similar to the first stage.

The double-resonance response that is observed in the presence of soliton states can be attributed to the superposition of weak continuous background and intense soliton pulses. Due to different intensities each component induces a different Kerr shift to the cavity resonance which we can discriminate by the modulation probing. Since the pump is far detuned from the cavity resonance, the high-frequency peak in the modulation response corresponds to the cavity resonance that is slightly shifted by the CW component (C-resonance). The peak position in this way indicates the effective detuning. On the other hand, the resonance shifted by solitons appears as the low-frequency peak (S-resonance). The position of the S-resonance is nearly fixed as it depends on the intensity of individual soliton, while the magnitude is related to the number of solitons (N).

Figure 14:
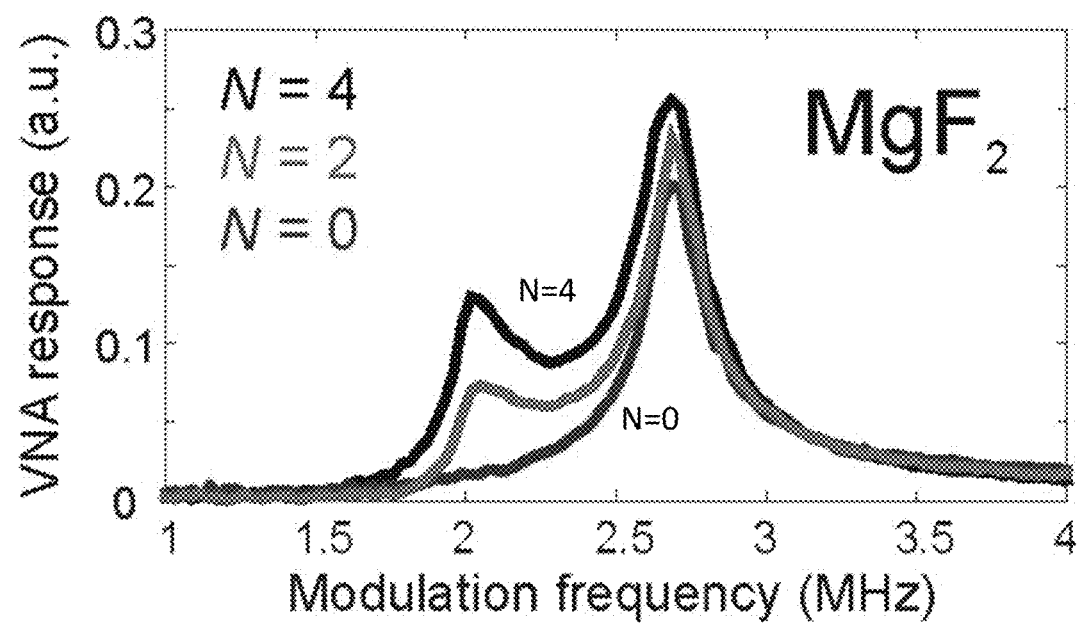
Figure 15:
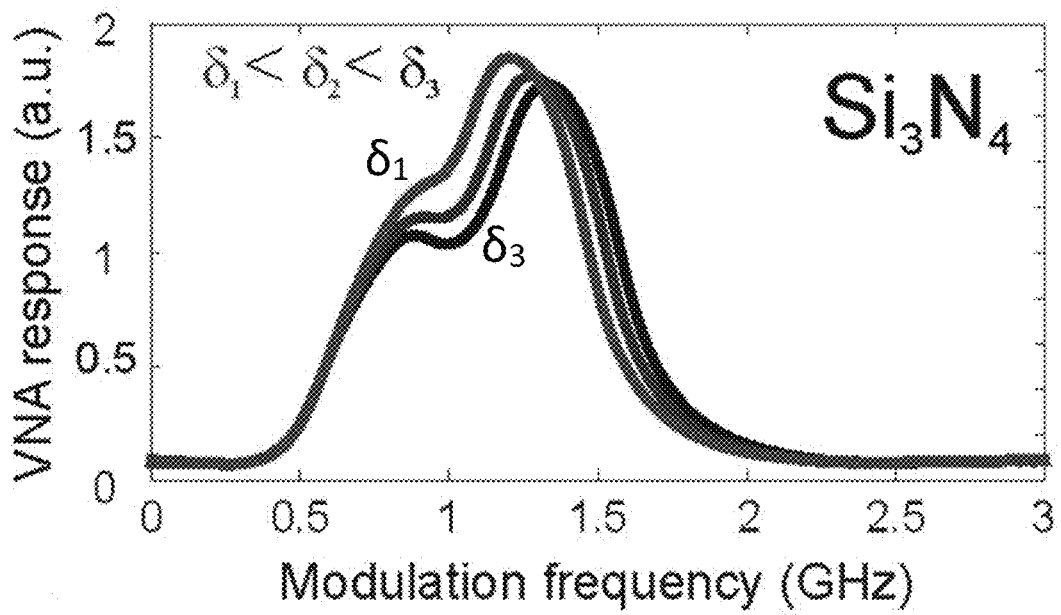
Figure 16:
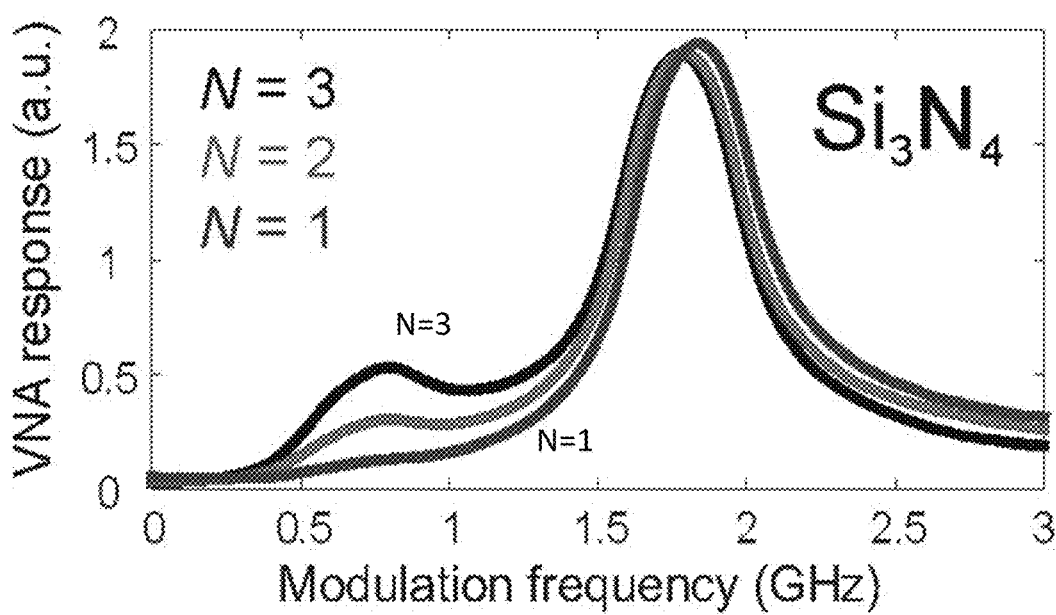

The non-destructive soliton probing was applied to both $Si_3N_4$ and $MgF_2$ microresonators. The double-resonance response is observed in both platforms when having soliton state frequency combs, and was investigated with different soliton number N and pump detunings, see FIG. 13 to 16. The response is qualitatively similar for both platforms. The peak position of the $C$-resonance varies with the pump frequency (FIGS. 13 and 15), while the S-resonance frequency is practically fixed as predicted. The peak height of the S-resonance linearly depends on the soliton number N (FIGS. 14 and 16). A theoretical analysis of the non-destructive soliton probing scheme confirms the double-resonance response of a soliton state (see FIGS. 17 and 18).

The response of dissipative Kerr solitons to weak amplitude pump modulation was previously numerically investigated. While two peaks in the response were also numerically observed in that work (and attributed conceptually to Feshbach and relaxation oscillations in the presence of third order dispersion), the present results reveal the underlying physical origin of the soliton probing scheme, not requiring higher order dispersion. Moreover, phase modulation provides higher contrast of the modulation response.

As a way to extract the effective pump detuning $\delta_{eff}$, the probing technique enables to precisely track the process of microresonator frequency comb generation. In a soliton state, thermal drifts of the cavity resonance originating from various external sources may cause variations of $\delta_{eff}$. Based on the modulation response 25, the effective detuning can be monitored and adjusted (e.g. by tuning the pump frequency) in order to maintain the soliton state within the soliton existence range. In practice, feedback-locking of $\delta_{eff}$ is possible, which allows for long-term operation of a soliton state in a microresonator 3.

Transitions of soliton states in the laser backward tuning by applying the non-destructive soliton probing in $Si_3N_4$ microresonators are shown in FIGS. 19 to 20. Forward tuning is first employed in order to generate a multiple soliton state with N=6, and then slow backward tuning is performed. The power trace of the generated light in the microresonator 3 again shows the staircase pattern in the backward tuning, which corresponds to successive soliton switching from N=6 to the single soliton state (FIG. 19). The VNA traces are simultaneously recorded and continuously stacked in order to monitor the evolution of the modulation response during the process (see FIG. 19).

The results reveal a relationship between the evolution of modulation response 25 and the soliton switching. Within each soliton step, the C-resonance shifts towards the S-resonance due to the decrease of the effective detuning when the laser is tuned backward. When the two resonances overlap, the amplitude of S-resonance is significantly enhanced, leading to a high-intensity single-peak profile (FIG. 19). The phenomenon is also confirmed by the theory. The next moment after having such a response, soliton switching occurs, which results in the power drop in the generated light trace as one soliton is extinct (N→N−1).

After the switching, the $C$-resonance abruptly separates from the S-resonance. Meantime, while still being Kerr locked, the S-resonance intensity is reduced to a lower level than the previous state, since the number of solitons is reduced by one. In the absence of solitons (N=0), the S-resonance equally is absent in the modulation response, but the $C$-resonance is still present and captured (FIG. 19).

The same measurement was carried out in $MgF_2$ resonators, see FIG. 20. Similar switching dynamics as in $Si_3N_4$ microresonators are observed: (1) the power trace shows staircase profile of successive soliton switching; (2) the backward tuning shifts the VNA $C$-resonance towards the S-resonance; (3) soliton switching occurs with the overlap of $C$- and S-resonances and the enhancement of the S-resonance intensity. However, there are several details which differ between $Si_3N_4$ and $MgF_2$ platforms. First, the optical quality factor Q of $MgF_2$ crystalline resonators (~$10^9$) is three order of magnitude higher than for $Si_3N_4$ micro-rings (~$10^6$). The $C$- and S-resonances in the modulation response of crystalline resonator are better resolved as a result of the narrower linewidth. The laser tuning range in $Si_3N_4$ microresonators is O (1 GHz), while that in $MgF_2$ resonators is O (1 MHz). Second, after each soliton switching the $MgF_2$ resonator shows slower recoil of the $C$-resonance than the $Si_3N_4$ microresonator. This is attributed to the distinct thermal relaxation of the two platforms. The $MgF_2$ resonator has a larger effective mode volume and physical size than the chip-scale $Si_3N_4$ micro-ring resonators such that the thermal relaxation time is longer. In the evolution of the modulation response of the $MgF_2$ resonator (FIG. 3(f)), the recoil of the $C$-resonance leaves curved trajectory while it is very abrupt in the $Si_3N_4$ microresonator.

The non-destructive soliton probing scheme combined with the backward tuning allows an understanding of the soliton switching dynamics in microresonators. The modulation response clearly predicts the switching and therefore provides a convenient tool to control the soliton states and induce switching on demand. In devices, one can perform deterministic switching by tuning the pump frequency, while monitoring the effective laser frequency detuning revealed by the VNA response.

The successive soliton switching in backward tuning is attributed to the thermal nonlinearity of optical microresonators. Due to material absorption, the intracavity energy of a soliton state thermally shifts the cavity resonance via thermal expansion and thermal change of the refractive index: $\omega_0'=\omega_0-\Delta_T$, where $\Delta_T$ is the thermally induced resonance shift which is approximately (neglecting cross term) proportional to the energy of intracavity field:

$$\Delta_T(N) \propto E_C + N \cdot E_S \qquad (1)$$

where $E_C$ is the energy of the $C$ component, $E_S$ is the energy of one soliton and N the number of solitons. Thus, the effective detuning can be expressed as $2\pi\delta_{eff}=\omega_0-\Delta_T-\omega_p$.

Physically, the soliton switching occurs when the laser backward tuning reduces the detuning to the bifurcation point of the system. This boundary value can be identified from the VNA trace and is represented by the position of the S-resonance. After the switching, one soliton is extinct which decreases the energy in the cavity, and thereby reduces the thermal shift $\Delta_T$. This spontaneously stabilizes the system in a new soliton state, by effectively increasing the effective detuning. The process is reflected in the evolution of the modulation response (see FIG. 19) as a separation of $C$- and S-resonance after the switching. It should be also noted that the recoiled $C$-resonance frequency is similar after each switching event, because the resonator loses approximately similar amount of energy. Overall, the thermal nonlinearity lifts the degeneracy of soliton states with respect to the pump frequency.

The pump backward tuning enables deterministic and successive soliton switching, opening access to soliton states N, N−1, . . . , 1. It is therefore possible to experimentally explore the soliton existence range in terms of the absolute and the effective detuning in each state, which to the inventors best knowledge has never been directly experimentally measured for cavity solitons of any kind. In terms of effective detuning, we express the soliton existence range as $\delta_s<\delta_{eff}<\delta_{max}$. The lower boundary $\delta_s$ is identified in the backward soliton switching: it corresponds to the frequency where the $C$-resonance and the fixed S-resonance overlap. In the studied $Si_3N_4$ microresonator under chosen pumping conditions this quantity is measured as $\delta_s \sim 0.78$ GHz. The upper detuning boundary $\delta_{max}$ of the soliton existence range can be explored for each soliton state when the pump laser is tuned forward until the soliton comb disappears. Based on the theory and standard LLE simulations, this detuning is expected to be identical for all states corresponding to different number of solitons (see FIG. 24), as the boundary of the energy balance of dissipative Kerr solitons. In experiments under the same pumping conditions such maximum effective detuning $\delta_{max}$ is found for all soliton states as ~2.0 GHz, yet no clear feature in the modulation response enables to predict this maximum boundary.

FIG. 21 displays a one-trace mapping of six steps of soliton states in $Si_3N_4$ microresonator as a function of the absolute pump frequency (wavelength) (i.e. the absolute detuning $\delta$). For each soliton step, we first tune the pump forward approaching the maximum detuning ($\delta \rightarrow \delta_{max}$), and then tune backward towards the soliton switching point ($\delta \rightarrow \delta_s$) where the soliton state is switched from N to N−1. Since the thermally induced cavity resonance shift is included in the absolute frequency detuning, we observe that the soliton existence range in the absolute detuning is increasingly offset for a larger number of soliton. This creates the staircase pattern of the generated light and enables successive soliton switching. However, if the generated light trace is plotted with respect to the effective laser detuning ($\delta_{eff}$) as done in FIG. 22, it appears that all the soliton steps are stacked vertically within the range $\delta_s < \delta_{eff} < \delta_{max}$, which corresponds to the expected theoretical diagram when the thermal effect is neglected.

We performed numerical simulations based on both LLE and coupled mode equations with the additional thermal relaxation equation included which verify that the deterministic soliton switching is enabled by the thermal nonlinearity of the microresonator (FIGS. 23 and 24). By including the thermal effects into numerical simulations, we are able to reproduce the staircase power trace, corresponding to the successive reduction of the soliton number in the backward pump tuning (cf. red curve in FIG. 23). Analytical power traces of soliton steps (black dashed lines) indicate soliton existence ranges for multiple-soliton states with different N. They reveal a displacement of the soliton existence range between different soliton states (qualitatively similar to the measured in FIG. 21) as a consequence of the thermal nonlinearity.

When the thermal effects in simulations are "switched off", soliton steps are well aligned and the soliton existence range is again degenerate with respect to the soliton number (N), see FIG. 24. No soliton switching is therefore observed in the backward tuning. Numerical simulation also revealed the soliton breather states that is considered as an intermediate state between the chaotic MI operation regime and the stable soliton state. In the breather state, the soliton pulse peak power and the pulse duration, as well as the average intacavity energy, will experience periodical oscillations. This induces thermal perturbations to the cavity resonance and initiates the soliton switching.

The inventors experimentally, numerically and analytically demonstrate the discovery that soliton states in a microresonator are not detuning degenerate, and can be individually addressed by laser detuning. This effect is platform independent and can be used in a laser backward tuning process to achieve a successive reduction of the soliton number ($N \rightarrow N-1 \rightarrow \ldots \rightarrow 1$).

This deterministic switching is enabled by the thermal nonlinearity of the microresonator and provides a route to obtain a single soliton state from an arbitrary multiple soliton state.

A non-destructive soliton probing technique enables to track the thermal impact of external perturbations of the system on its stability. The technique also allows to lock the soliton state against the impact of these perturbations and gives clear insights of soliton dynamics inside the cavity.

Combining this technique with the laser backward tuning allows for deterministic soliton switching and makes accessible any target multiple-soliton state in a predictable way. The results are in good agreement with analytical treatment of the soliton comb including thermal effects as well as numerical simulations, and can be applied to all Kerr nonlinear microresonators.

While the invention has been disclosed with reference to certain preferred embodiments, numerous modifications, alterations, and changes to the described embodiments, and equivalents thereof, are possible without departing from the sphere and scope of the invention. Accordingly, it is intended that the invention not be limited to the described embodiments, and be given the broadest reasonable interpretation in accordance with the language of the appended claims.

REFERENCES

[1] P. Del'Haye, A. Schliesser, O. Arcizet, T. Wilken, R. Holzwarth, and T. J. Kippenberg, Nature 450, 1214 (2007).
[2] T. J. Kippenberg, R. Holzwarth, and S. Diddams, Science 332, 555 (2011).
[3] T. J. Kippenberg, S. M. Spillane, and K. J. Vahala, Phys. Rev. Lett. 93, 083904 (2004).
[4] A. A. Savchenkov, A. B. Matsko, D. Strekalov, M. Mohageg, V. S. Ilchenko, and L. Maleki, Phys. Rev. Lett. 93, 243905 (2004).
[5] P. Del'Haye, T. Herr, E. Gavartin, M. L. Gorodetsky, R. Holzwarth, and T. J. Kippenberg, Phys. Rev. Lett. 107, 063901 (2011).
[6] Y. Okawachi, K. Saha, J. Levy, H. Wen, M. Lipson, and A. Gaeta, Opt. Lett. 36, 3398 (2011).
[7] T. Herr, K. Hartinger, J. Riemensberger, C. Wang, E. Gavartin, R. Holzwarth, M. L. Gorodetsky, and T. J. Kippenberg, Nat. Photon. 6, 480 (2012).
[8] F. Ferdous, H. Miao, D. E. Leaird, K. Srinivasan, J. Wang, L. Chen, L. T. Varghese, and A. M. Weiner, Nature Photon. 5, 770 (2011).
[9] S. Papp, P. Del'Haye, and S. Diddams, Opt. Express 21, 17615 (2013).
[10] T. Herr, V. Brasch, J. D. Jost, C. Wang, M. Kondratiev, M. L. Gorodetsky, and T. J. Kippenberg, Nat. Photon. 8, 145 (2014).
[11] V. Brasch, M. Geiselmann, T. Herr, G. Lihachev, M. H. P. Pfeiffer, M. L. Gorodetsky, and T. J. Kippenberg, Science (2015), 4811.
[12] M. Karpov, H. Guo, A. Kordts, V. Brasch, M. H. P. Pfeiffer, M. Zervas, M. Geiselmann, and T. J. Kippenberg, arXiv:1506.08767 (2015).
[13] X. Yi, Q.-F. Yang, K. Y. Yang, M.-G. Suh, and K. Vahala, Optica 2, 1078 (2015).
[14] T. Ideguchi, S. Holzner, B. Bernhardt, G. Guelachvili, N. Picqué, and T. W. Hänsch, Nature 502, 355 (2013).
[15] J. Pfeifle, V. Brasch, M. Lauermann, Y. Yu, D. Wegner, T. Herr, K. Hartinger, P. Schindler, J. Li, D. Hillerkuss, R.

Schmogrow, C. Weimann, R. Holzwarth, W. Freude, J. Leuthold, T. J. Kippenberg, and C. Koos, Nat. Photon. 8, 375 (2014).
[16] J. Pfeifle, A. Kordts, P. Marin, M. Karpov, M. H. P. Pfeiffer, V. Brasch, R. Rosenberger, J. Kemal, S. Wolf, W. Freude, T. J. Kippenberg, and C. Koos, in *CLEO:* 2015 *Postdeadline Paper Digest* (Optical Society of America, 2015) p. JTh5C.8.
[17] S. Papp, K. Beha, P. Del'Haye, F. Quinlan, H. Lee, K. Vahala, and S. Diddams, Optica 1, 10 (2014).
[18] F. Leo, S. Coen, P. Kockaert, S.-P. Gorza, P. Emplit, and M. Haelterman, Nat. Photon. 4, 471 (2010).
[19] W. Liang, D. Eliyahu, V. Ilchenko, A. Savchenkov, A. Matsko, D. Seidel, and L. Maleki, Nat. Commun. 6 (2015).
[20] I. S. Grudinin and N. Yu, in Laser Resonators, *Microresonators, and Beam Control XVII*, Proceedings of SPIE, Vol. 9343 (2015) pp. 93430F-93430E-9, 10.1117/12.2085420.
[21] J. K. Jang, M. Erkintalo, S. Coen, and S. G. Murdoch, Nature communications 6 (2015).
[22] Y. K. Chembo and N. Yu, Phys. Rev. A 82, 033801 (2010).
[23] Y. Chembo and C. Menyuk, Phys. Rev. A 87, 053852 (2013).
[24] S. Coen, H. Randle, T. Sylvestre, and M. Erkintalo, Opt. Lett. 38, 37 (2013).
[25] C. Godey, I. Balakireva, A. Coillet, and Y. Chembo, Phys. Rev. A 89, 063814 (2014).
[26] M. Lamont, Y. Okawachi, and A. Gaeta, Opt. Lett. 38, 3478 (2013).
[27] J. Levy, A. Gondarenko, M. Foster, A. Turner-Foster, A. Gaeta, and M. Lipson, Nat. Photon. 4, 37 (2010).
[28] D. Moss, R. Morandotti, L. Gaeta, and M. Lipson, Nat. Photon. 7, 597 (2013).
[29] M. A. Foster, J. S. Levy, O. Kuzucu, K. Saha, M. Lipson, and A. L. Gaeta, Opt. Express 19, 14233 (2011).
[30] V. S. Ilchenko, A. A. Savchenkov, A. B. Matsko, and L. Maleki, Phys. Rev. Lett. 92, 043903 (2004).
[31] I. S. Grudinin, A. B. Matsko, A. A. Savchenkov, D. Strekalov, V. S. Ilchenko, and L. Maleki, Opt. Commun. 265, 33 (2006).
[32] W. Liang, A. A. Savchenkov, A. B. Matsko, V. S. Ilchenko, D. Seidel, and L. Maleki, Opt. Lett. 36, 2290 (2011).
[33] V. B. Braginsky, M. L. Gorodetsky, and V. S. Ilchenko, Physics Letters A 137, 393 (1989).
[34] T. Carmon, L. Yang, and K. Vahala, Opt. Express 12, 4742 (2004).
[35] X. Yi, Q.-F. Yang, K. Y. Yang, M.-G. Suh, and K. Vahala, Optica 2, 1078 (2015).
[36] A. E. Fomin, M. L. Gorodetsky, I. S. Grudinin, and V. S. Ilchenko, J. Opt. Soc. Am. B 22, 459 (2005).
[37] A. B. Matsko and L. Maleki, Phys. Rev. A 91, 013831 (2015).
[38] M. H. P. Pfeiffer, A. Kordts, V. Brasch, M. Zervas, M. Geiselmann, J. D. Jost, and T. J. Kippenberg, Optica 3, 20 (2016).
[39] A. Kordts, M. Pfeiffer, H. Guo, V. Brasch, and T. J. Kippenberg, arXiv:1511.05381 (2015).
[40] P. Del'Haye, O. Arcizet, M. L. Gorodetsky, R. Holzwarth, and T. J. Kippenberg, Nat. Photon. 3, 529 (2009).

The invention claimed is:

1. A soliton generation apparatus comprising:
an optical resonator for generating multiple solitons;
a pumping laser for providing light at a pumping wavelength into the optical resonator;
a tuning device for tuning the pumping wavelength across an optical resonance wavelength of the optical resonator or the optical resonance wavelength of the optical resonator across the pumping wavelength to generate multiple solitons inside the optical resonator, and for changing the wavelength detuning between the pumping laser wavelength and the optical resonance wavelength of the optical resonator to remove at least one soliton of the generated multiple solitons to provide (i) a plurality of solitons that comprises at least one less soliton than that of the generated multiple solitons or (ii) a single soliton in the optical resonator;
a photodetector for receiving light output from the optical resonator and producing a corresponding output signal;
a processor configured to
control the tuning device to generate multiple solitons in the optical resonator and to change the wavelength detuning between the pumping laser wavelength and an optical resonance wavelength of the optical resonator to remove at least one soliton of the generated multiple solitons,
process the output signal to determine a removal of a soliton from the optical resonator through the identification of a step profile in the corresponding output signal,
stop detuning when the removal of the at least one soliton is determined from the corresponding output signal, and
control the detuning device to tune at a tuning speed slower than a thermal relaxation rate of the optical resonator.

2. Apparatus according to claim 1, wherein the detuning device comprises a thermal tuner configured to apply or remove thermal energy to or from the optical resonator to displace the optical resonance wavelength of the optical resonator towards the pumping wavelength.

3. Apparatus according to claim 2, wherein the thermal tuner is configured to apply or remove thermal energy to or from the optical resonator to displace the optical resonance wavelength of the optical resonator across the pumping wavelength to generate the multiple solitons in the optical resonator.

4. Apparatus according to claim 1, wherein
the pumping laser is configured to provide light at a first wavelength into the optical resonator; and the apparatus includes:
a laser tuning controller configured to: (a) forward tune the pumping laser to tune the pumping laser light from the first wavelength, across a cavity resonance of the optical resonator, to a second wavelength to generate a frequency comb and multiple solitons in the optical resonator, the second wavelength being longer than the first wavelength;
and configured to (b) backward tune the pumping laser light from the second wavelength to a third wavelength to remove at least one soliton of the generated multiple solitons to provide (i) a plurality of solitons that comprises at least one less soliton than that of the generated multiple solitons or (ii) a single soliton in the optical resonator, the third wavelength being shorter than the second wavelength.

5. Apparatus according to claim 4, wherein the processor is configured to determine the removal of a least one soliton during forward and/or backward tuning from the optical resonator light output signal.

6. Apparatus according to claim 5, wherein the processor is configured to control the laser tuning controller to stop tuning when the removal of a least one soliton is determined.

7. Apparatus according to claim 5, wherein the processor is configured to control the laser tuning controller to carry out further backward tuning until a single soliton remains in the optical resonator based on determined soliton removals.

8. Apparatus according to claim 5, wherein the processor is configured to control the laser tuning controller to backward tune the laser light from the second wavelength to the third wavelength to remove solely one soliton of the generated multiple solitons to provide (i) a plurality of solitons that comprises one less soliton than that of the generated multiple solitons or (ii) a single soliton in the optical resonator.

9. Apparatus according to claim 5, wherein the processor is configured to control the laser tuning controller to backward tune the laser light from the third wavelength to lower wavelengths to remove solitons of the plurality of solitons one-by-one to provide a single soliton in the optical resonator.

10. Apparatus according to claim 5, wherein the processor is configured to control the laser tuning controller to adiabatically backward tune the laser light.

11. Apparatus according to claim 5, wherein the processor is configured to control the laser tuning controller to backward tune the laser light at a tuning speed that is slower than a thermal relaxation rate of the optical resonator.

12. Apparatus according to claim 1, wherein the optical resonator is a crystalline resonator or an on-chip resonator.

13. Apparatus according to claim 1, further including a phase modulator for modulating the pumping laser light to non-destructively probe soliton generation in the optical resonator.

14. Apparatus according to claim 13, further including a modulation response analyzer for receiving an optical response signal outputted by the optical resonator and configured to determine a modulation response signal representing the response of the optical resonator to the phase modulation of the pumping laser light.

15. Apparatus according to claim 14, further including a processor configured to determine, from the modulation response signal, an effective pump detuning value representing the detuning of the pump laser frequency/wavelength from a cavity resonance frequency/wavelength of the optical resonator during the apparatus operation or pumping.

16. Apparatus according to claim 15, wherein the processor is configured to monitor the effective pump detuning value to maintain a soliton state in the optical resonator.

17. Apparatus according to claim 16, wherein the processor is configured to adjust the effective pump detuning value by controlling the laser tuning controller to tune the pump laser frequency/wavelength to maintain a soliton state in the optical resonator.

18. Apparatus according to claim 14, further including a processor configured to monitor the evolution of the modulation response signal or the effective pump detuning value while carrying out backward tuning to determine the extinction of one single soliton state in the optical resonator.

19. Apparatus according to claim 18, wherein the processor is configured to monitor the evolution of the modulation response signal or the evolution of the effective pump detuning value during backward tuning to determine successive extinctions of individual solitons, and configured to control the laser tuning controller to stop tuning to provide a single soliton in the optical resonator.

20. Apparatus according to claim 19, wherein the processor is configured to monitor the effective pump detuning value and to control the tuning device or the laser tuning controller to tune the pump laser frequency/wavelength to maintain the single soliton state in the optical resonator.

21. Soliton generation apparatus according claim 1, wherein the optical resonator is a crystalline resonator or an on-chip resonator and the apparatus further includes a coupling waveguide optically coupled to the optical resonator, the pumping laser light being provided to the optical resonator via the coupling waveguide.

22. A soliton generation method including the steps of:
introducing pumping laser light at a pumping wavelength into an optical resonator;
generating multiple solitons in the optical resonator by tuning the pumping wavelength across an optical resonance wavelength of the optical resonator or tuning the optical resonance wavelength of the optical resonator across the pumping wavelength;
providing light output from the optical resonator to a photodetector to produce a corresponding output signal; and
changing the wavelength detuning between the pumping laser wavelength and the optical resonance wavelength of the optical resonator to remove at least one soliton of the generated multiple solitons to provide (i) a plurality of solitons that comprises at least one less soliton than that of the generated multiple solitons or (ii) a single soliton in the optical resonator, wherein the corresponding output signal is processed to determine a removal of a soliton from the optical resonator through the identification of a step profile in the corresponding output signal, and detuning is stopped when the removal of the at least one soliton is determined from the corresponding output signal to provide (i) a plurality of solitons that comprises at least one less soliton than that of the generated multiple solitons or (ii) a single soliton in the optical resonator,
wherein the detuning device is tuned at a tuning speed slower than a thermal relaxation rate of the optical resonator.

23. Method according to claim 22, wherein the step of changing the wavelength detuning is carried out by applying or removing thermal energy to or from the optical resonator to displace the optical resonance wavelength of the optical resonator towards the pumping wavelength.

24. Method according to claim 22, wherein the step of generating multiple solitons is carried out by applying or removing thermal energy to or from the optical resonator to displace the optical resonance wavelength of the optical resonator across the pumping wavelength to generate the multiple solitons in the optical resonator.

25. Method according to claim 22 further including the steps of:
introducing the pumping laser light at a first wavelength into the optical resonator;
forward tuning the pumping laser light from the first wavelength, across theft cavity resonance of the optical resonator, to a second wavelength to generate a frequency comb and multiple solitons in the optical resonator, the second wavelength being longer than the first wavelength; and
backward tuning the pumping laser light from the second wavelength to a third wavelength to remove at least one soliton of the generated multiple solitons to provide (i) a plurality of solitons that comprises at least one less soliton than that of the generated multiple solitons or (ii) a single soliton in the optical resonator, the third wavelength being shorter than the second wavelength.

26. Method according to claim 25, wherein the step of backward tuning the laser light from the second wavelength to the third wavelength removes solely one soliton of the generated multiple solitons to provide (i) a plurality of solitons that comprises one less soliton than that of the generated multiple solitons or (ii) a single soliton in the optical resonator.

27. Method according to claim 26, further including the step of backward tuning the laser light from the third wavelength to lower wavelengths to remove solitons of the plurality of solitons one-by-one to provide a single soliton in the optical resonator.

28. Method according to claim 25, wherein the backward tuning of the laser light is carried out adiabatically.

29. Method according to claim 25, wherein the backward tuning of the laser light is carried out at a tuning speed that is slower than a thermal relaxation rate of the optical resonator.

30. Method according to claim 25, wherein the backward tuning of the laser light is carried out at a constant tuning speed.

31. Method according to claim 25, wherein the intensity of the pumping laser light is substantially constant.

32. Method according to claim 25, wherein the soliton is a dissipative Kerr soliton and/or the optical resonator is a crystalline resonator or an on-chip resonator.

33. Method according to claim 22, further including the step of phase modulating the pumping laser light to non-destructively probe soliton generation in the optical resonator.

34. Method according to claim 33, further including the step of measuring an optical response signal outputted by the optical resonator and determining a modulation response signal to non-destructively probe soliton generation in the optical resonator.

35. Method according to claim 34, further including the step of determining, from the modulation response signal, an effective pump detuning value representing the detuning of the pump laser frequency/wavelength from they cavity resonance frequency/wavelength of the optical resonator during the apparatus operation or pumping.

36. Method according to claim 35, further including the step of monitoring the effective pump detuning value to maintain a soliton state in the optical resonator.

37. Method according to claim 36, further including the step of adjusting the effective pump detuning value by tuning the optical resonance wavelength of the optical resonator or the pump laser frequency/wavelength to maintain a soliton state in the optical resonator.

38. Method according to claim 34, further including the step of monitoring the evolution of the modulation response signal or the effective pump detuning value while carrying out backward tuning to determine the extinction of one single soliton state in the optical resonator.

39. Method according to claim 32, wherein monitoring of the modulation response signal or the evolution of the effective pump detuning value is carried out while carrying out backward tuning to determine successive extinctions of individual solitons and provide a single soliton in the optical resonator.

40. Method according to claim 39, further including the steps of monitoring and adjusting the effective pump detuning value to maintain the single soliton state in the optical resonator.

* * * * *